United States Patent
Hitomi et al.

[11] Patent Number: 5,168,839
[45] Date of Patent: Dec. 8, 1992

[54] ENGINE INDUCTION SYSTEM

[75] Inventors: Mitsuo Hitomi, Hiroshima; Tadashi Nakagawa; Kiyotaka Mamiya, both of Higashihiroshima; Takayoshi Hayashi, Kumage; Tadayoshi Kaide, Hiroshima, all of Japan

[73] Assignee: Mazda Motor Corporation, Hiroshima, Japan

[21] Appl. No.: 707,335

[22] Filed: May 29, 1991

[30] Foreign Application Priority Data

Jun. 1, 1990 [JP] Japan ..................... 2-144936
Jun. 29, 1990 [JP] Japan ..................... 2-173713
May 15, 1991 [JP] Japan ..................... 3-110432

[51] Int. Cl.$^5$ .................... F02M 35/10; F02M 25/07
[52] U.S. Cl. ................... 123/52 M; 123/432; 123/445; 123/568
[58] Field of Search ........ 123/52 M, 52 MV, 52 MC, 123/431, 432, 443, 472, 568, 569, 571, 445

[56] References Cited

U.S. PATENT DOCUMENTS

| | | | |
|---|---|---|---|
| 3,924,598 | 12/1975 | Davis | 123/431 X |
| 4,354,463 | 10/1982 | Otani et al. | 123/568 X |
| 4,357,017 | 11/1982 | Aoyama | 123/568 X |
| 4,532,905 | 8/1985 | Yokooku et al. | 123/443 |
| 4,617,898 | 10/1986 | Gayler | 123/460 |
| 4,700,684 | 10/1987 | Pischinger et al. | 123/568 |
| 4,732,116 | 3/1988 | Tanahashi et al. | 123/568 X |
| 4,741,295 | 5/1988 | Hosoya et al. | 123/52 MV |

FOREIGN PATENT DOCUMENTS 0235835 1/1987 European Pat. Off. .

OTHER PUBLICATIONS

Patent Abstracts of Japan, Kokai No. 62-26320 (Toyota Motor Corp.) (Feb. 4, 1987).
Patent Abstracts of Japan, Kokai No. 63-105275 (Mazda Motor Corp.) (Oct. 5, 1988).

*Primary Examiner*—Willis R. Wolfe
*Attorney, Agent, or Firm*—Fish & Richardson

[57] ABSTRACT

An engine induction system includes intake passages connected to inlet ports of an engine, an injector provided in the intake passage for injecting fuel in an intake plenum between the injector and the inlet port, the injector being disposed in such a position that the volume of the intake plenum is greater than the predetermined stroke volume. This ensures improved vaporization and atomization of fuel and mixing of fuel and air, and improves the combustibility and increases the charging efficiency of use of latent heat of vaporization.

24 Claims, 19 Drawing Sheets

ENGINE INDUCTION SYSTEM

BACKGROUND OF THE INVENTION AND PRIOR ART STATEMENT

This invention relates to an engine induction system having an injector for injecting fuel to an intake manifold.

There has been generally known an engine induction system having an injector for injecting fuel to an intake manifold in which the fuel from the injector is mixed with the air in the intake manifold and supplied to a combustion chamber. Such engine induction system is disclosed, for example, in Unexamined Japanese Patent Publication No. 61-61010.

In an engine induction system of this kind, there have been considered various modifications in which an arrangement of an injector is changed to improve atomization and distributivity of fuel. For example, Unexamined Japanese Patent Publication No. 59-147866 discloses an engine induction system in which two types of injectors are provided in an intake manifold. One injector is used in any operating condition and the other used only in high load operating condition. These injectors are respectively adapted for injecting fuel in designated operating conditions to further atomization of the fuel. Unexamined Japanese Patent Publication No. 61-186061 discloses an engine induction system provided with a main injector and a starting injector in an intake manifold. Unexamined Japanese Patent Publication No. 63-105275 discloses an engine induction system provided with a first injector for injecting fuel at a latter stage of an intake stroke for stratified charge in a combustion chamber and a second injector for supplementarily injecting fuel. Unexamined Japanese Patent Publication No. 61-241461 discloses an engine induction system in which the fuel injected from an injector is supplied to a plurality of intake runners through a distribution pipe.

However, in the conventional engine induction systems, the distance between an injector and an inlet port located at a downstream end of an intake runner is relatively short in order to improve the responsiveness of fuel supply to the combustion chamber and due to a limitation in layout of the engine. Accordingly, the residual time of fuel in the intake runner is short. Consequently, it has been difficult to sufficiently vaporize or atomize the fuel, and mix the fuel with the air in the intake runner.

In the aforementioned system provided with two types of injectors, one injector is disposed more upstream than the other by some distance. However, the distance between the upstream injector and an inlet port of the combustion chamber is too short to provide an intake runner volume equivalent to the stroke volume of a cylinder to which the intake runner is connected. Accordingly, all the fuel injected from the injector is inducted in the cylinder during one intake stroke. Therefore, it has been difficult to provide such a residual time as to ensure vaporization and atomization of fuel and mixing of fuel and air.

Further, there has been generally known an engine provided, in addition to injectors, with an exhaust gas recirculation (hereinafter referred to as an EGR) means for recirculating exhaust gas to the induction system of the engine to improve the emission and the mileage. Specifically, in light and medium load operating zones, the EGR is effected so that nitrogen oxides (hereinafter referred to as NOx) in the engine is reduced. In addition, the mileage will be also improved due to a reduction in pumping loss since introduction of new air to the induction system is restricted and suction pressure is reduced in the EGR. However, if the vaporization, atomization and mixing with fuel and air is insufficient, particularly with a larger amount of recirculated exhaust gas, the combustibility will be deteriorated, resulting in a higher likelihood of ignition failure. Accordingly, the engine provided with the EGR means has faced a drawback that the amount of recirculating exhaust gas cannot be increased to a larger extent and thus cannot attain a satisfactory combustibility.

SUMMARY OF THE INVENTION

In view of the aforementioned drawbacks, it is an object of the present invention to provide an engine induction system which makes it possible to ensure a greatly increased combustibility, improved mileage, and enhanced power output.

It is another object of the present invention to provide an engine induction system mountable on an engine carrying exhaust gas recirculation means which makes it possible to increase the amount of recirculating exhaust gas without causing an ignition failure to improve the combustibility.

According to the present invention, an induction system for use in an engine including a cylinder having an inlet port and a predetermined stroke volume comprises an intake passage connected to the inlet port, an injector provided in the intake passage for injecting fuel in an intake plenum between the injector and the inlet port, the injector being disposed in such a position that the volume of the intake plenum is greater than the predetermined stroke volume.

In this construction, the injector is positioned so that the volume of the intake plenum is greater than the predetermined stroke volume of the cylinder. Accordingly, not all the fuel injected from the injector can be inducted into the cylinder during one intake stroke. A part of the fuel will remain in the intake passage until the next intake stroke. This remaining fuel stays in the intake passage for a period of time equivalent to the time required for one cycle of the engine, so that the fuel can be further, vaporized and mixed with the air. Consequently, the mixture of fuel and air can have an increased combustibility.

Also, an induction system for use in an engine including a cylinder having an inlet port and a predetermined stroke volume comprises an intake passage connected to the inlet port, an upstream injector provided in the intake passage for injecting fuel in the intake plenum between the injector and the inlet port, the upstream injector being disposed in such a position that the volume of the intake plenum is greater than the predetermined stroke volume, and a downstream injector provided in the intake passage near the inlet port for injecting fuel.

In this construction, the upstream injector is disposed in such a position that the volume of the intake plenum is greater than the predetermined stroke volume. The downstream injector is disposed in the intake passage near the inlet port. Accordingly, the fuel can be further vaporized because of remaining in the intake passage for a longer period of time, and the combustibility of fuel is consequently improved. In addition, the downstream injector is allowed to inject fuel simultaneously with the upstream injector according to the necessity. Accordingly, an adequate amount of fuel can be supplied to the cylinder so as to maintain satisfactory responsibility of the fuel supply to the change in the operating condition.

Further, an induction system for use in an engine including a cylinder having an inlet port and a predetermined stroke volume comprises an intake passage connected to the inlet port, an upstream injector provided in the intake passage for injecting fuel in the intake plenum between the injector and the inlet port, the upstream injector being disposed in such a position that the volume of the intake plenum is greater than the predetermined stroke volume, and a downstream injector provided in the intake passage near the inlet port for injecting fuel, an exhaust gas recirculation regulating means for regulating the amount of recirculating exhaust gas into the induction system, controlling means for controlling the exhaust gas recirculation regulating means and the upstream injector so as to increase the amount of recirculating exhaust gas and increase the ratio of fuel amount injected from the upstream injector to fuel amount injected from the downstream injector in a light load operating zone and a medium load operating zone of the engine.

This engine induction system is used for an engine provided with exhaust gas recirculation means. The fuel supply is effected by the upstream injector in a light load operating zone and a medium load operating zone. Accordingly, satisfactory combustibility can be obtained in even the light and medium load operating zones. Also, the atomization and vaporization of fuel is furthered in the intake passage, and the fuel is sufficiently mixed with the air and internally recirculated exhaust gas because the upstream injector is disposed in such a position that the volume of the intake plenum is greater than the predetermined stroke volume. Consequently, the likelihood of the ignition failure can be eliminated with a larger amount of internally recirculated exhaust gas present.

These and other objects, features and advantages of the present invention will become more apparent upon a reading of the following detailed description and accompanying drawings.

DETAILED DESCRIPTION OF PREFERRED EMBODIMENTS OF THE INVENTION

Figure 1:
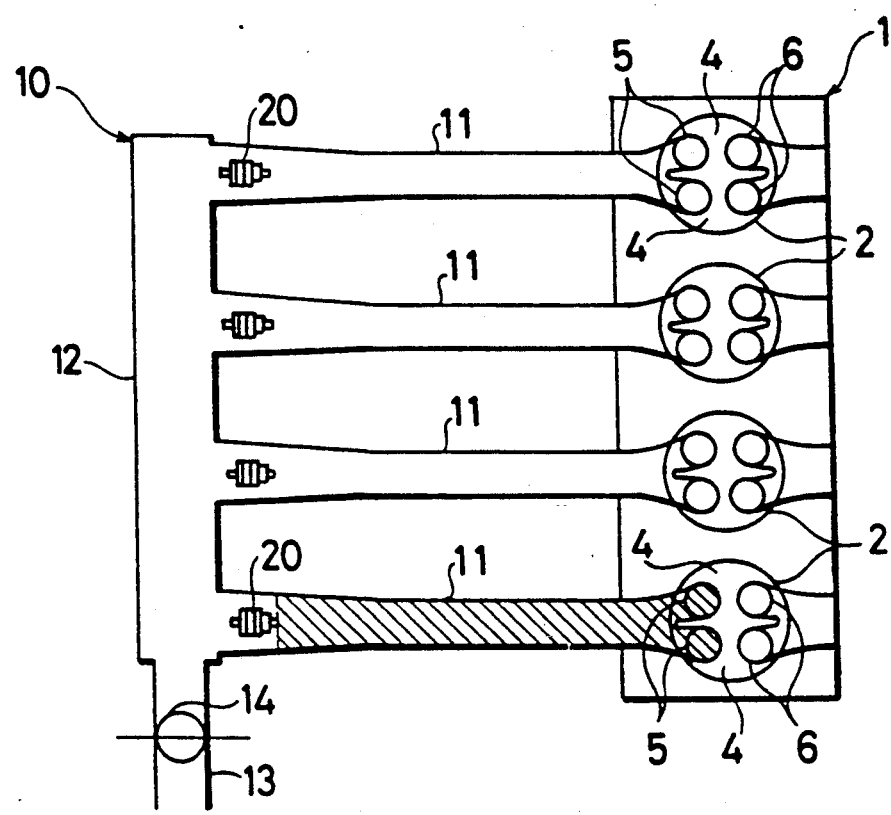
FIG. 1 is a schematic diagram showing a construction of an engine induction system embodying the invention as a first embodiment.

Engine induction systems embodying the present invention will be described with reference to the drawings. In the drawings, like numerals generally designate like parts in embodiments to be described below.

Figure 2:
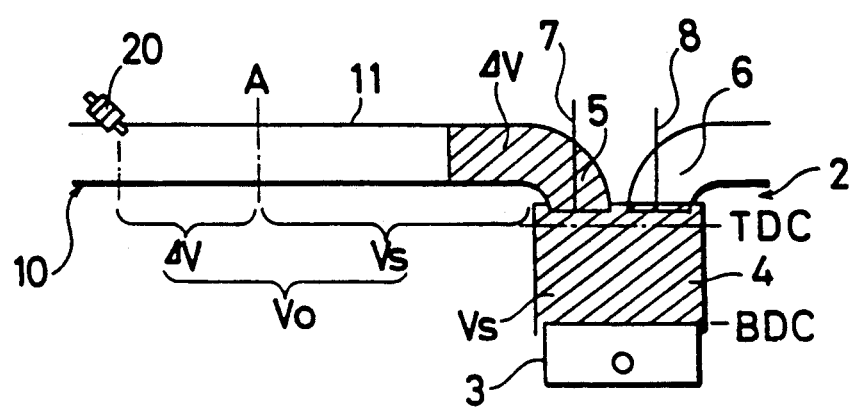
FIG. 2 is a transverse sectional diagram showing the engine induction system shown in FIG. 1.

FIGS. 1 and 2 show a first embodiment of the invention. FIG. 1 is a schematic diagram showing a construction of an first engine induction system embodying the invention, and FIG. 2 is a transverse sectional diagram showing the engine induction system shown in FIG. 1. An engine main body 1 is provided with a plurality of cylinders 2, four cylinders in FIGS. 1 and 2. Each cylinder 2 has a piston 3 and a combustion chamber 4 above the piston 3. The combustion chamber 4 has an inlet port 5 and an exhaust port 6 in a top portion thereof. Both ports 5 and 6 are made openable and closable respectively by an intake valve 7 and an exhaust valve 8 at predetermined timings.

An intake manifold is adapted for feeding the intake air to the engine main body 1. The intake manifold 10 comprises an intake runner 11 provided for each cylinder 2, a surge tank 12 connected to an upstream end of each intake runner 11, a common intake passage 13 connected to an upstream end of the surge tank 12. The intake runner 11 is extended to the inlet port 5. In the common intake passage 13 is disposed a throttle valve 14 for controlling the amount of intake air in accordance with movement of an accelerator.

In each of the intake runner 11 is disposed an injector 20 for injecting fuel. The injector 20 is disposed in such a position that the volume of runner between the inlet port 5 and the injector 20, i.e., the runner volume between the opening of the combustion chamber 4 and the injector 20, is greater than the stroke volume of the cylinder to which the intake runner 11 is connected. In the embodiment shown in FIG. 1, each intake runner 11 has a length sufficient to form the above-mentioned runner volume. The injector 20 is disposed in an upstream end portion of each intake runner 11. Consequently, as shown in FIG. 2, the runner volume Vo of the intake runner 11 between the inlet port 5 and the injector 20, i.e., an oblique-lined portion in FIG. 1, is greater than the stroke volume Vs of the cylinder to which the intake runner 11 is connected.

The above construction will be further described with reference to FIG. 2. The stroke volume Vs is a capacity in the cylinder 2 between the top dead center TDC and the bottom dead center BDC of the piston 3. The runner volume Vs between the inlet port 5 and a position indicated at A in FIG. 2 is equal to the stroke volume Vs. The injector 20 is disposed upstream of the position A. Accordingly, assuming that a capacity between the position A and the injector 20 is $\Delta V$, the runner volume Vo between the inlet port 5 and the injector 20 can be expressed by the following equation.

$$Vo = Vs + \Delta V$$

In the above engine induction system, the runner volume Vo downstream of the injector 20 is greater than the stroke volume Vs. Accordingly, the fuel can be further mixed with the air and vaporized in the intake runner 11.

In conventional induction systems, all the fuel injected from an injector before the intake stroke is inducted into the cylinder during one intake stroke. However, in the engine of this embodiment, not all the fuel injected from the injector 20 can be inducted into the cylinder 2 during one intake stroke. Accordingly, the fuel present in the capacity $\Delta V$ will remain in the intake runner 11 until the next intake stroke. This remaining fuel stays in the intake runner 11 for a period of time which is equivalent to the time required for one cycle of the engine 1, so that the fuel can be further vaporized and mixed with the air. Consequently, a mixture of the fuel and air will have an increased combustibility.

Also, in a high load zone, a layer amount of fuel is vaporized in the intake runner 11. Accordingly, higher cooling effect can be obtained due to more latent heat accompanying the vaporization of the layer amount of fuel. The cooling effect in turn increases the air density, and then increases the charging efficiency. Consequently, higher power output can be obtained.

In this embodiment, it is desirable that the fuel injection period during which fuel is injected from the injector 20 start after an elapse of a predetermined time following the inlet port opening period. Here, the predetermined time is a time required for a pressure wave to be transmitted from the inlet port 5 to the position of the injector 20. Specifically, the predetermined time can be obtained by dividing the distance between the inlet port 5 and the injector 20 by the sound velocity.

By setting the fuel injection time in this manner, fuel is injected when a flow of the intake air is generated in a periphery of the injector 20. The generation of the intake air flow is delayed by the time required for transmission of the pressure wave, after the air suction is started during the intake stroke. Thus, the fuel is diffused in the intake runner 11 downstream of the injector 20 by the generated air flow, thereby improving atomization of the fuel.

Such fuel injection time can be useful for other embodiments to be described below, such as an embodiment shown in FIG. 10.

Figure 3:
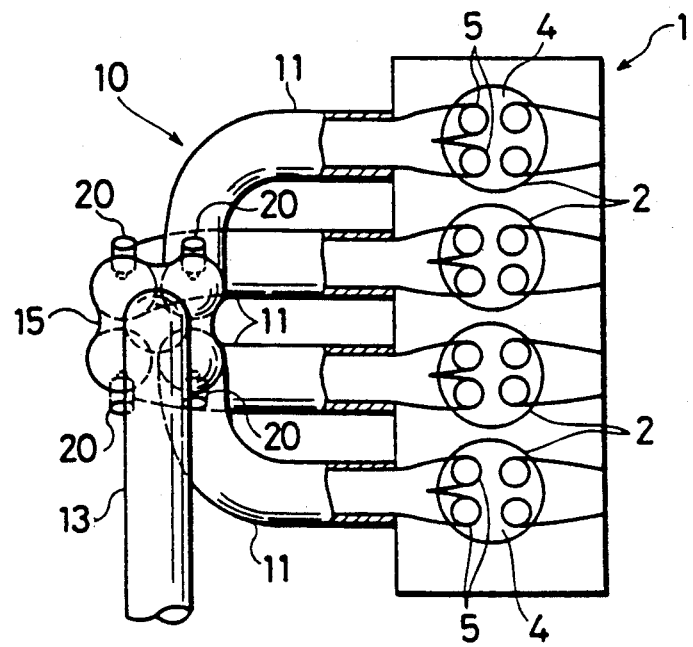
FIG. 3 is a schematic diagram showing a construction of an engine induction system embodying the invention as a second embodiment.
Figure 4:
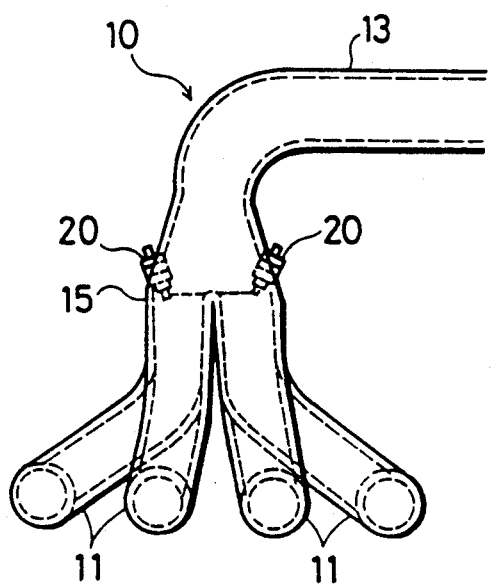
FIG. 4 is a diagram showing an intake manifold of the engine induction system shown in FIG. 3 viewed from a right side.
Figure 5:
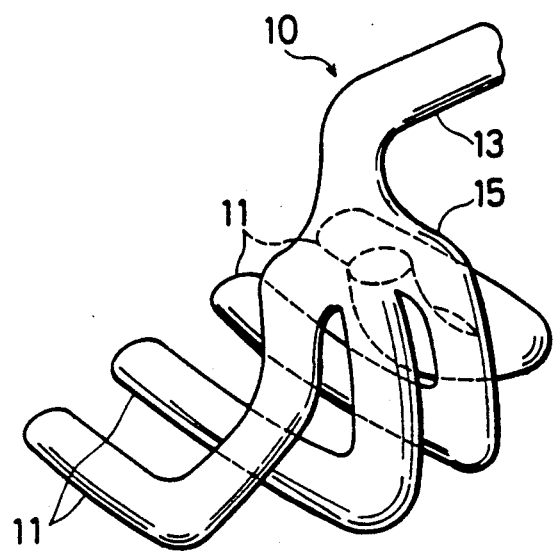
FIG. 5 is a perspective diagram showing the intake manifold viewed from an upper right rear side.

FIGS. 3 to 5 shows a second embodiment of the invention. FIG. 3 is a schematic diagram showing a construction of a second engine induction system embodying the invention. FIG. 4 is a diagram showing an intake manifold 10 of the engine induction system shown in FIG. 3 viewed from the right side. FIG. 5 is a diagram perspectively showing the intake manifold 10.

In this embodiment, respective upstream ends of intake runners 11 connected to inlet ports 5 of cylinders 2 are connected to a convergent portion 15. An upstream end of the convergent portion 15 is connected to a common intake passage 13. The convergent portion 15 is formed in such a manner that the intake runners 11 are converged equiangularly to the common intake passage 13. In other words, the convergent portion 15 is formed in such a manner that the intake air flows into each intake runner 11 under an equalized condition. More specifically, the intake runners 11 are cubicly connected to the convergent portion 15 with the upstream ends of the intake runners 11 being symmetrical with respect to the center of the convergent portion 15. The intake runners 11 have a uniform positional relationship to the common intake passage.

In this second embodiment, injectors 20 are disposed in a periphery portion of the convergent portion 15. The distance between each injector 20 and the inlet port 5 is set so as to provide the runner volume greater than the stroke volume of the cylinder to which the intake runner 20 is connected. In FIG. 3, the injector 20 is disposed in the position of each intake runner 11 that is near the convergent portion 15. However, it may also be appropriate that a single injector be disposed in an upstream position of the convergent portion 15.

The second embodiment demonstrates similar advantageous effects to the first embodiment, such as improved vaporization of fuel due to the fact that the fuel remains in the intake runner for a longer period of time.

In addition, the second embodiment demonstrates an improved fuel distribution to each cylinder. In an engine induction system in which a plurality of intake runners are convergedly connected to a common intake passage, a plurality of injectors being provided near the convergent portion or a single injector being provided upstream of the convergent portion, a mixture of fuel and air flows back to the convergent portion because of simultaneous opening of intake and exhaust valves or reverse flow at a last stage of the intake stroke, and a portion of the flowed back mixture is robbed by other cylinders. In this case, if the intake runners are asymmetrically connected to the common intake passage, the flowed back mixture is nonuniformly robbed by other cylinders, consequently reducing the fuel distribution. On the contrary, in the induction system of this embodiment in which the intake runners 11 are symmetrically assembled into the convergent portion 15, an equalized amount of fuel can be distributed to each cylinder. Accordingly, an improved fuel distribution can be attained.

Figure 6:
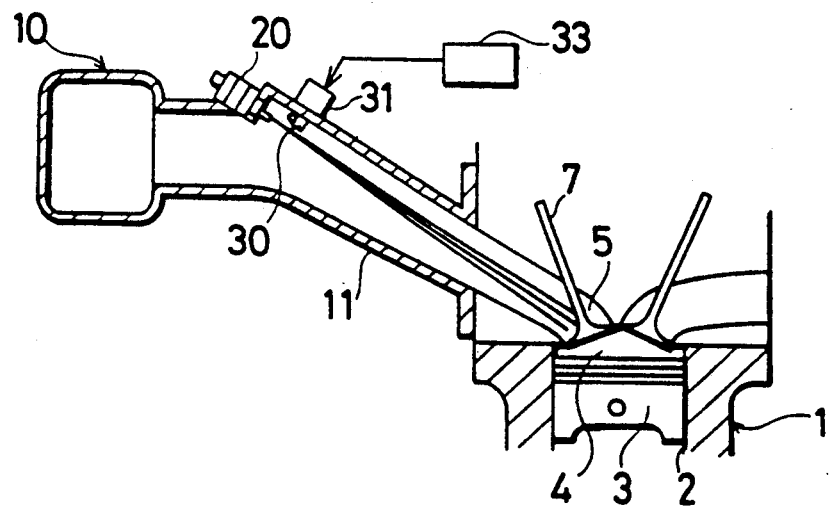
FIG. 6 is a transverse sectional diagram of an engine induction system embodying the invention as a third embodiment.
Figure 7:
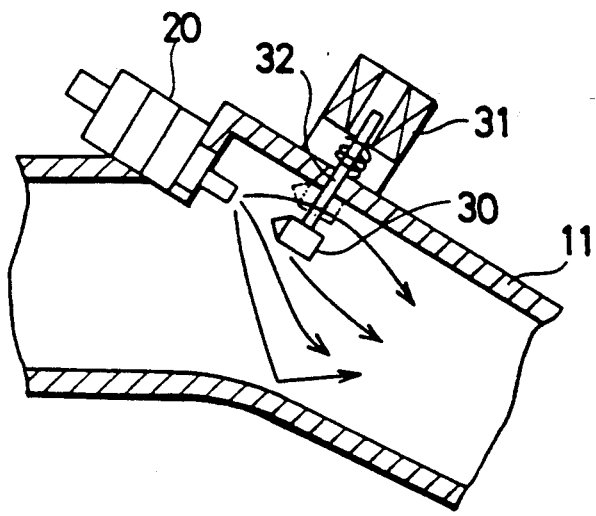
FIG. 7 is a transverse sectional diagram partially showing an injector of the engine induction system shown in FIG. 6.

FIGS. 6 and 7 show a third embodiment of the invention. FIG. 6 is a transverse sectional diagram of an engine induction system embodying the invention as a third embodiment. FIG. 7 is a transverse sectional diagram of the third engine induction system partially showing an injector provided in the third engine induction system. In the third embodiment, an injector 20 is also disposed in a position away from an inlet port 5 which is sufficient to render the runner volume between the inlet port 5 and the injector 20 greater than the stroke volume of the cylinder to which the intake runner is connected. However, in this embodiment, an intake runner 11 is generally shaped into a linear form from the injector 20 to the inlet port 5. The injector 20 is disposed in such a manner that the fuel injected therefrom is directed at an intake valve for the inlet port 5. Before the injector 20 is disposed a diffusing member (fuel diffusing means) for diffusing the injected fuel in a specific driving operation.

The diffusing member 30 is mounted on a lower end of a rod 32 to be actuated by a solenoid 31 and movable between a fuel diffusing position (a solid line position in FIG. 7) facing the injector 20 and a retracted position (phantom line position in FIG. 7) retracted from the former position toward an upper wall of the intake runner 11 where the diffusing member 30 does not serve to diffuse the injected fuel.

The solenoid 31 is controlled by a control unit 33. The control unit 33 is adapted for determining whether the present operating condition is in a transitive condition to either a sudden acceleration or a sudden deceleration or otherwise in a normal state in accordance with a sensor signal from an unillustrated throttle opening sensor for detecting the opened angle of the throttle valve. The control unit 33 allows the diffusing member 30 to move to the fuel diffusing position in the normal operating condition and to the retracted position in the transitive operating condition.

Further, in the case where the diffusing member 30 is provided which is controlled in accordance with the operating condition, it is desirable that the injector 20 have a large injecting power sufficient to inject the fuel as far as the intake valve.

In this embodiment, the form of the intake runner 11 from the injector 20 to the inlet port 5 is substantially linear. This can prevent the likelihood that the injected fuel comes into direct contact with the wall of the intake runner 11. As a result, the fuel deposition on the wall of the intake runner 11 can be suppressed.

Also, in this embodiment, in which the diffusing member 20 controllable in accordance with the operating condition is provided as described above, the injecting power of the injector 20 can be increased so that the fuel injected from the injector 20 can reach the intake valve 7.

In addition, the fuel is diffused by the diffusing member 30 as shown in FIG. 7 in the normal operating condition, further improving the atomization of the fuel coupled with the effect brought about by the fact that the injector 20 is disposed away from the inlet port 5 by the above-mentioned sufficient length.

On the other hand, in the transitive operating condition, when the residual time of the fuel in the intake runner 11 is prolonged, the fuel supply to the combustion chamber becomes less responsive to the fuel requirement therein. In other words, the fuel supply to the combustion chamber becomes less responsive to changes in the operating condition. However, in the transitive operating condition, the diffusing member 30 is moved to the retracted position and thereby the fuel from the injector 20 is directly injected up to the intake valve (see FIG. 6.) Therefore, the fuel supply in the transitive operating condition becomes more responsive.

Figure 8:
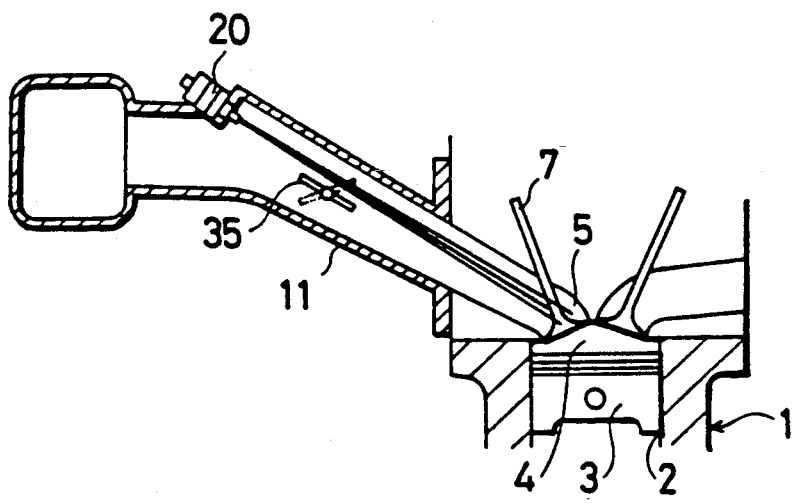
FIG. 8 is a transverse sectional diagram, similar to FIG. 6, showing a modified example of the fuel diffusing means shown in FIG. 6.
Figure 9:
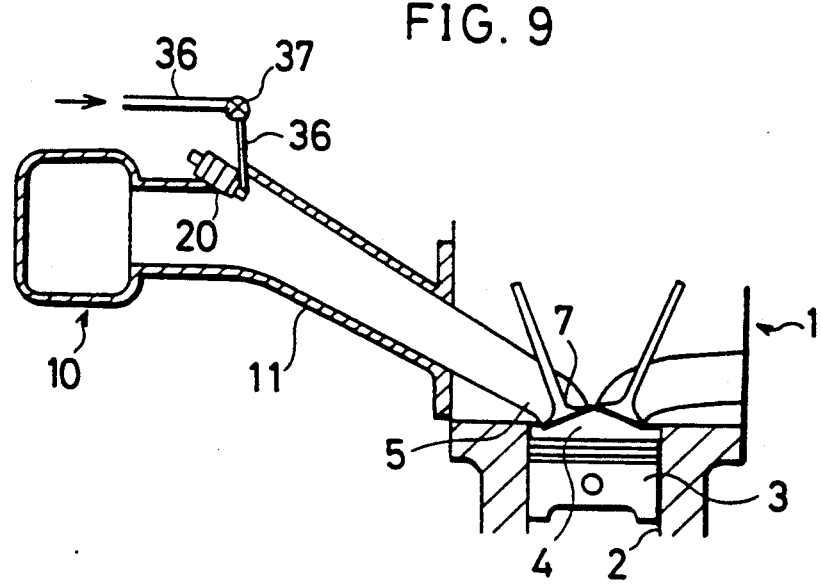
FIG. 9 is a transverse sectional diagram, similar to FIG. 6, showing another modified example of the fuel diffusing means shown in FIG. 6.

FIGS. 8 and 9 are respectively transverse sectional diagrams, similar to FIG. 6, showing other examples of the fuel diffusing means of the third embodiment. A diffusing member 35 shown in FIG. 8 is in the form of a butterfly valve and is rotatable about an axis. In a solid line position, the diffusing member 35 does not serve to diffuse the fuel injected from the injector 20. When rotated to the phantom line position in which the diffusing member 35 comes in the injection flow, the diffusing member 35 serves to diffuse the fuel. The diffusing member 35 is actuated by an unillustrated actuator.

A fuel diffusing means shown in FIG. 9 has an air bleeding tube 36 connected to an injecting end of the injector 20. In the air bleeding tube 36 is disposed an electromagnetic valve 37 for opening and closing the tube 36. When the air bleeding tube 36 is opened, the fuel injected from the injector 20 is diffused by the air supplied from an unillustrated air source. On the other hand, when the air bleeding tube 36 is closed, the fuel is injected from the injector 20 without being diffused.

In the diffusing means shown in FIGS. 8 and 9, it may also be appropriate that the fuel diffusing means be made controllable by unillustrated control means so that diffusion of the fuel is effected in the normal operating condition and not in the transitive condition.

Figure 10:
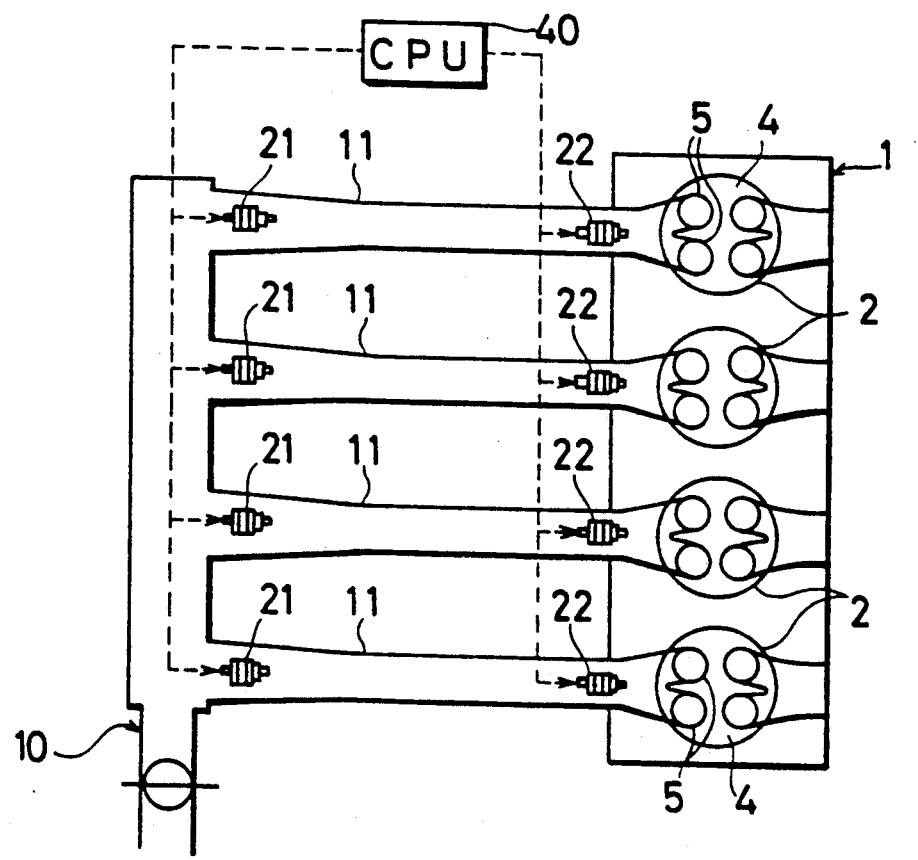
FIG. 10 is a schematic diagram showing a construction of an engine induction system embodying the invention as a fourth embodiment.

FIG. 10 is a schematic diagram showing a construction of an engine induction system embodying the invention as a fourth embodiment. In the fourth embodiment, each intake runner 11 has an upstream injector 21 and a downstream injector disposed 22 therein. Similar to the foregoing embodiments, such as the first embodiment, the upstream injector 21 is disposed in such a position as to render the runner volume between an inlet port 5 and the injector 20 greater than the stroke volume of the cylinder to which the intake runner 11 is connected. On the contrary, the downstream injector 22 is disposed near the inlet port 5. The fuel injection from the injectors 21, 22 are controlled by a control unit (CPU) 40 in accordance with the operating condition. In the control executed by the CPU 40, the upstream injector 21 is made to basically inject the fuel and the downstream injector 22 is made to additionally inject the fuel when a high fuel supply responsibility is required. For example, in the normal operating condition including a state where changes in load for the engine and rotational speed of the engine are relatively small, the amount of fuel corresponding to the amount of intake air or the like is injected only from the upstream injector 21. On the contrary, in the transitive operating condition, i.e., in the sudden acceleration or deceleration, while the upstream injector 21 is allowed to inject a basic amount of fuel, the downstream injector 22 is allowed to inject a supplementary amount of fuel. Further, it may be appropriate that only the downstream injector 22 is allowed to inject the fuel in the transitive operating condition.

In the induction system of the fourth embodiment, the upstream injector 21 is allowed to inject the fuel in the normal operating condition. Accordingly, the fuel can be further vaporized while remaining in the intake runner 11 similarly to the first embodiment or other foregoing embodiments, with the result that the combustibility of fuel is improved and larger amount of air is supplied to the combustion chamber 4. On the other hand, in the transitive operating condition such as a sudden acceleration, the fuel injection effected only by the upstream injector 21 cannot fully respond to the fuel supply required by the combustion chamber 4, resulting in less responsiveness to the change in the operating condition. However, since the downstream injector 22 effects the fuel injection simultaneously with the upstream injector 21 in this embodiment, an adequate amount of fuel can be supplied to the combustion chamber 4, thereby maintaining satisfactory responsibility of the fuel supply to the change in the operating condition.

Figure 11:
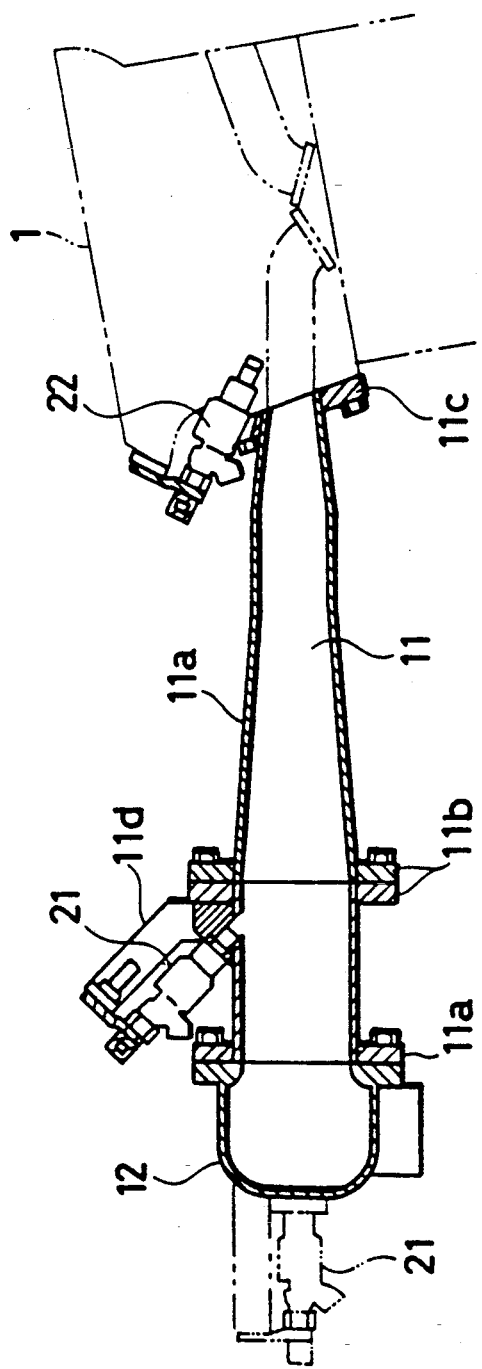
FIG. 11 is a transverse sectional view of the engine induction system of the fourth embodiment, showing a detailed construction of the engine induction system.
Figure 12:
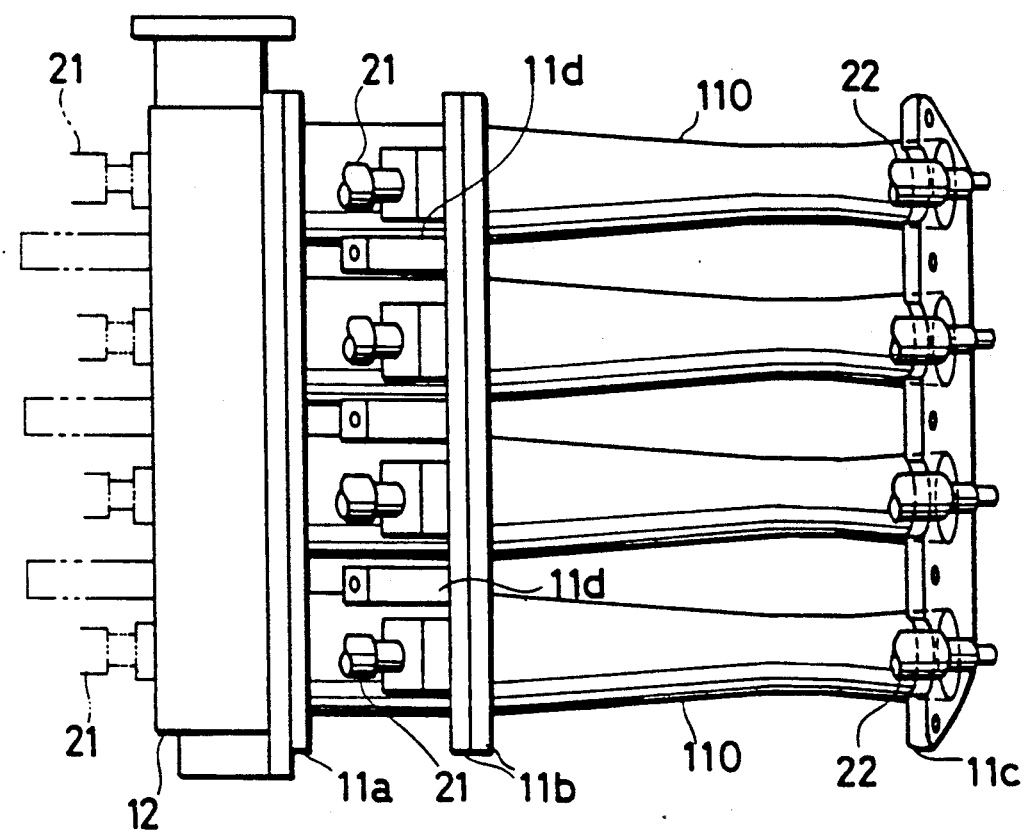
FIG. 12 is a plan view of the engine induction system of the fourth embodiment, showing a detailed configuration.

FIGS. 11 and 12 are respectively a transverse sectional diagram of the fourth engine induction system and a plan diagram of the fourth induction system, showing a detailed construction thereof. In these figures, the intake runner 11 include intake tubes 110 which are integrally connected to one another by flange members 11a, 11b, 11c at an upstream end position, an intermediate position, and a downstream end position. Each intake tube 110 has an upstream portion and an downstream portion. These intake tubes 110 are connected to a surge tank 12 by bolts through the flange portion 11a at the upstream end position while connected to a cylinder head 1 by bolts through the flange member 11c at the downstream end position. Further, the upstream portion and the downstream portion are connected to each other by bolts through the flange member 11b at the intermediate position. Each intake tube 110 is shaped into a linear form whose axis is linear. An upstream portion of the intake tube 110 has a circular cross section of a relatively large diameter, an intermediate portion thereof still has a circular cross section but of a slightly smaller diameter, and a downstream portion thereof has a laterally long elliptical cross section. The downstream end of the intake tube 110 is connected to a passage formed in the cylinder head 1. The passage extends to the inlet port 5 and forms a downstream portion of the intake runner 11.

In an upper wall of the upstream portion of the individual intake tube 110 is disposed an upstream injector 21 which faces the inside of the intake tube 110. Each of the upstream injectors 21 and a pipe for conveying fuel to the injector 21 are supported by a support member 11d connected to the intermediate flange member 11b. Further, a downstream injector 22 is disposed in the passage formed in the cylinder head 1 with which the downstream portion of the intake tube 110 communicates. Moreover, the upstream injector 21 may be provided in a wall of the surge tank 12 which faces the upstream end of the intake tube 110 as illustrated by phantom lines in FIGS. 11, 12 so as to inject fuel in an axial direction of the upstream portion of the intake tube 110. In this way, the likelihood of fuel deposition on the wall of the intake tube can be effectively suppressed.

Further, the construction of the induction system shown in FIGS. 11 and 12 can be used for the first induction system provided that the downstream injector 22 is omitted.

Figure 13:
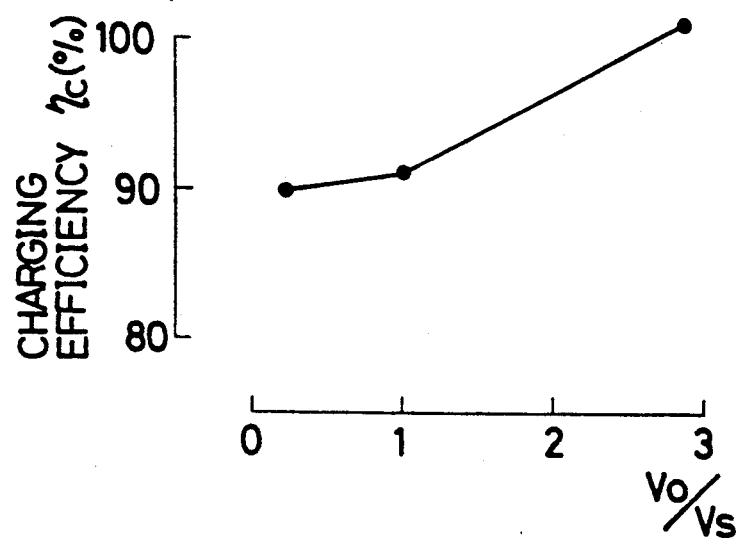
FIG. 13 is a graph showing charging efficiency $\eta c$ of an engine, wherein the charging efficiency $\eta c$ is plotted versus a ratio of a runner volume Vo to a stroke volume Vs of one cylinder.
Figure 14:
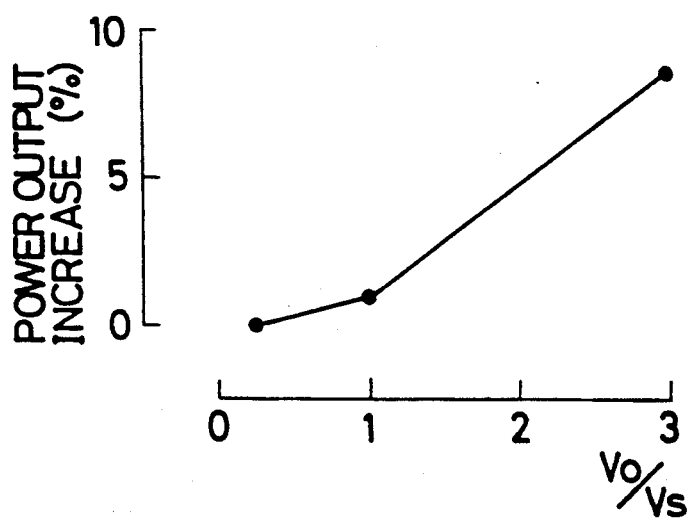
FIG. 14 is a graph showing a percentage increase in power output of an engine, wherein the percentage increase in power output is plotted versus a ratio of a runner volume Vo to a stroke volume Vs of one cylinder.

FIGS. 13 and 14 are graphs respectively showing advantageous effects brought about by the first and the fourth embodiments of the invention. FIG. 13 is a graph showing charging efficiency $\eta c$ of an engine, wherein the charging efficiency $\eta c$ is plotted versus a ratio of a runner volume Vo to a stroke volume Vs of one cylinder. FIG. 14 is a graph showing a percentage increase in power output of an engine, wherein the percentage increase in power output is plotted versus a ratio of a runner volume Vo to a stroke volume Vs of one cylinder. In experiments whose results are shown in the graphs of FIGS. 13 and 14, a testing device was used which has an intake system formed similarly to the embodiment shown in FIGS. 11 and 12. The purpose of this experiment was to examine a percentage increase in charging efficiency $\eta c$ and power output of the engine by changing the position of an injector.

Specifically, the following three cases were considered. The first case is where an injector was disposed near the downstream end of the intake runner, corresponding to the position where the downstream injector is disposed. In this position, a ratio of the runner volume Vo downstream of the injector to the stroke volume Vs of the cylinder was about 0.25 (Vo/Vs≈0.25.) The second case was where the injector was disposed more upstream than the former case so as to satisfy (Vo/Vs≈1.0.) The third case was where the injector was disposed further more upstream than the second case so as to satisfy (Vo/Vs≈3.0.) The technical significance of the charging efficiency ηc is generally known. Moreover, the percentage increase in power output of the engine was examined with the first case, i.e., (Vo/Vs≈0.25) as a base. The graph shown in FIG. 14 demonstrates a percentage increase in power output of the engine in the second and the third cases compared to the first case. These data show that the charging efficiency ηc and the power output sharply increase with a ratio of the runner volume Vo to the stroke volume Vs being greater than 1.

Figure 15:
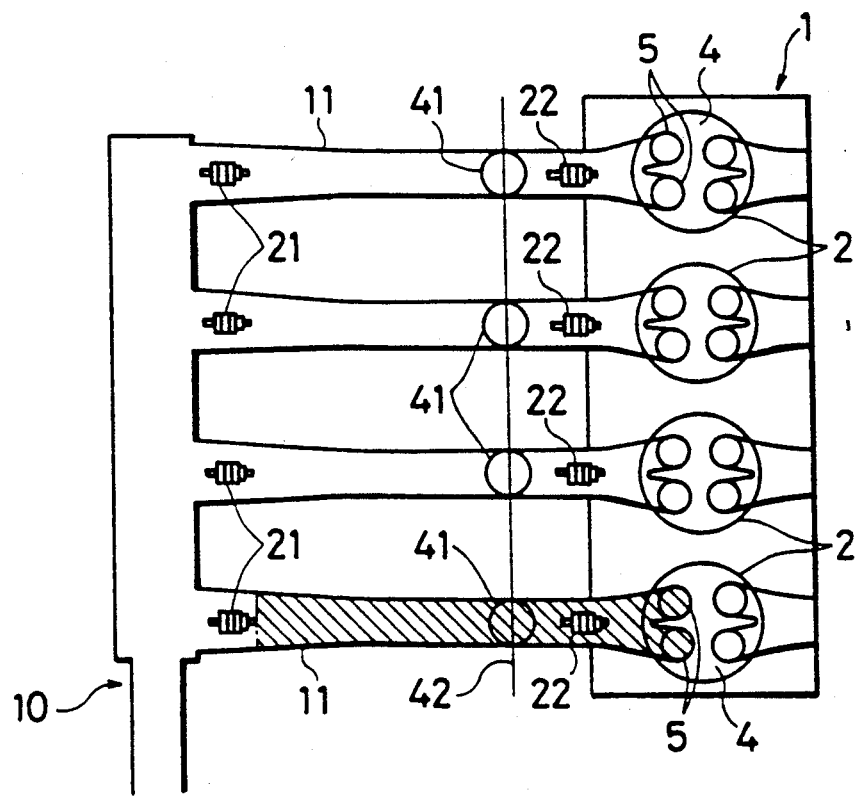
FIG. 15 is a schematic diagram showing a construction of an engine induction system embodying the invention as a fifth embodiment.

FIG. 15 is a schematic diagram showing a construction of an engine induction system embodying the invention as a fifth embodiment. In the fifth embodiment, each intake runner 11 has an upstream injector 21 and a downstream injector 22 disposed therein similarly to the fourth embodiment. In addition, a throttle valve 41 is disposed in each intake runner 11 downstream of the upstream injector 21 and upstream of the downstream injector 22. The throttle valves 41 are connected to a common rod 42 and integrally moved with one another. The valves 41 are driven by an unillustrated actuator or other driving means to throttle each intake runner 11 under a low load, for example. It may be appropriate that the throttle valves 41 be disposed independently from a main throttle valve provided in the induction system. It may also be appropriate that the main throttle valve be omitted and the throttle valves 41 have an additional function of regulating the amount of intake air in accordance with movement of the accelerator.

This embodiment can accomplish the same effects as the fourth embodiment. In addition, the intake runner 11 is throttled by the throttle valves 41 at the positions between the upstream injector 21 and the downstream injector 22. Accordingly, the rate of the intake air flow increases in the throttled portion of the intake runner 11, consequently improving the diffusion and atomization of fuel. As a result, the combustibility in the combustion chamber 4 can be further enhanced.

Figure 16:
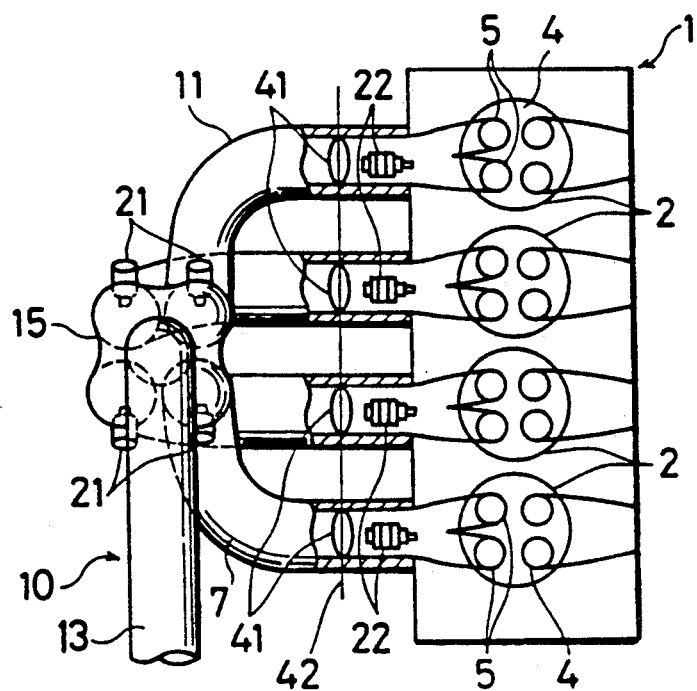
FIG. 16 is a schematic diagram showing a construction of an engine induction system embodying the invention as a sixth embodiment.

FIG. 16 is a schematic diagram showing a construction of an engine induction system embodying the invention as a sixth embodiment. In the sixth embodiment, an upstream injector 21 is disposed near an convergent portion 15 to have a sufficient distance from an inlet port 5. The convergent portion 15 is so formed that intake runners 11 can be equiangularly connected to a common intake passage 13 similarly to the convergent portion 15 shown in FIGS. 3 to 5. Further, a downstream injector 22 is disposed near the inlet port 5 of each cylinder 2.

The construction of this embodiment can be applicable in a case where an intake runner does not have length enough to provide a runner volume greater than the stroke volume of the cylinder to which the intake runner is connected. In such a case, a single upstream injector 22 may be disposed upstream of the convergent portion 15 similarly to an embodiment shown in FIG. 18 to be described below.

In this embodiment, the upstream injector 21 is disposed near or upstream of the convergent portion 15 so as to have a sufficient distance from the inlet port 5, an improved vaporization of fuel and smaller engine size can be obtained. Moreover, the intake runners 11 are converged equiangularly to the common intake passage 13 as mentioned above, consequently improving the fuel distribution. Further, the downstream injector 22 disposed in the intake runner 11 serves to improve the fuel supply responsiveness in the transitive operating condition. In this embodiment, it is also desirable that throttle valves 41 be disposed upstream of the respective downstream injectors 22.

Figure 17:
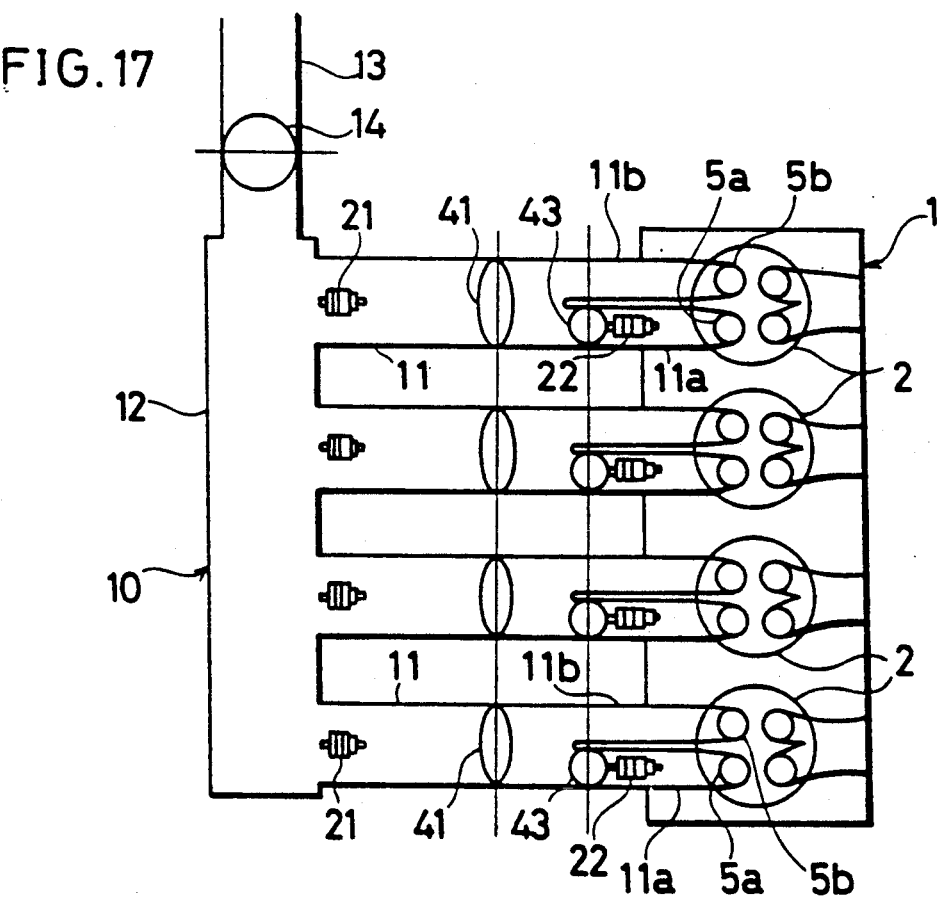
FIG. 17 is a schematic diagram showing a construction of the engine induction system having a function of regulating swirl of the intake air as a seventh embodiment.

FIG. 17 is a schematic diagram showing a construction of a seventh engine induction system of the present invention having a function of regulating swirl of intake air. In FIG. 17, each intake runner 11 has a secondary branch pipe 11a and a primary branch pipe 11b extending respectively to inlet ports 5a, 5b of each cylinder 2, the secondary branch pipe 11a having a shutter valve 43. The shutter valve 43 is actuated by an unillustrated actuator so as to, for example, close and open the secondary branch pipe 11a under a low load and a high load respectively. An upstream injector 21 is disposed in a position near the upstream end of the intake runner 11 so that the runner volume between the inlet port 5a, 5b and the upstream injector 21 is greater than the stroke volume of the cylinder to which the intake runner 11 is connected. Further, a downstream injector 22 is disposed downstream of the shutter valve 43 in the secondary branch pipe 11a. Moreover, a throttle valve 41 is disposed in a position between downstream of the upstream injector 21 and upstream of the branch pipes 11a, 11b. The opening angle of the throttle valve 41 corresponds to that of a main throttle valve 14 disposed in a common intake passage 13.

In this embodiment, the shutter valve 43 disposed in the secondary branch pipe 11a closes the secondary branch pipe 11a under low loads, so that a mixture of fuel and air is supplied to a combustion chamber 4 only through the primary branch pipe 11b. Accordingly, the rate of intake air flow is caused to speed up and thereby the intake air flow is swirled in the combustion chamber 4. Particularly in this state, the following advantageous effect can be obtained. The fuel injected from the upstream injector disposed sufficiently away from the inlet ports 5 remains in the intake runner 11 for a longer period of time. The fuel is further diffused by disturbance caused in the throttle valve 41 and the branch pipe 11b. These advantageous results work to considerably improve the mixing of air and fuel and the vaporization of fuel. Consequently, with the positive effect caused by the swirl in the combustion chamber 4 being added, the combustibility in the combustion chamber 4 can be greatly improved. On the contrary, at the time of acceleration, the shutter valve 43 is caused to open the secondary branch pipe 11a and the fuel is injected from the downstream injector 22 as well.

Figure 18:
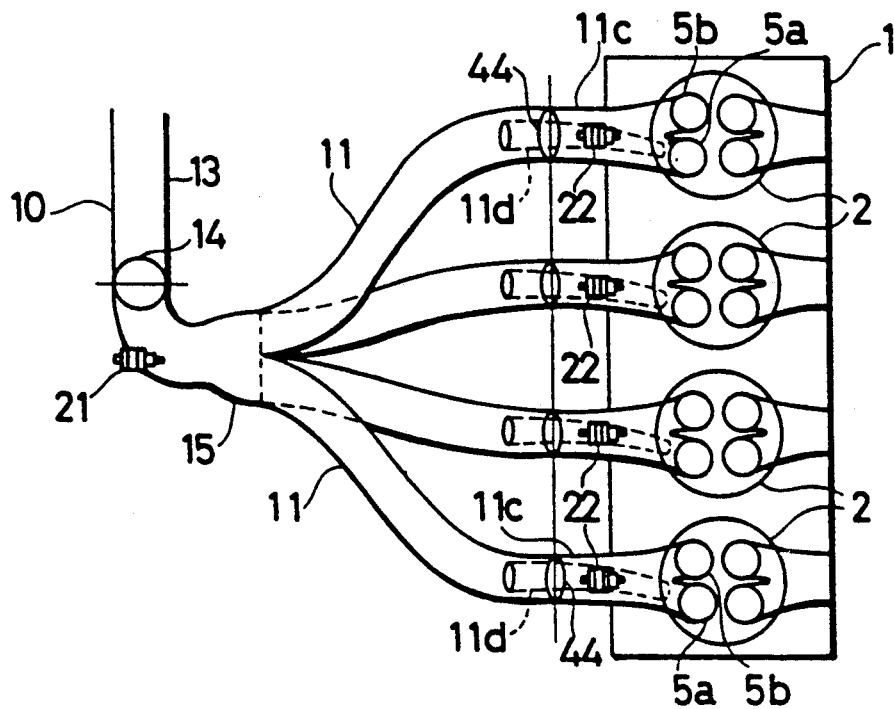
FIG. 18 is a schematic diagram showing a modified example of the seventh embodiment.
Figure 19:
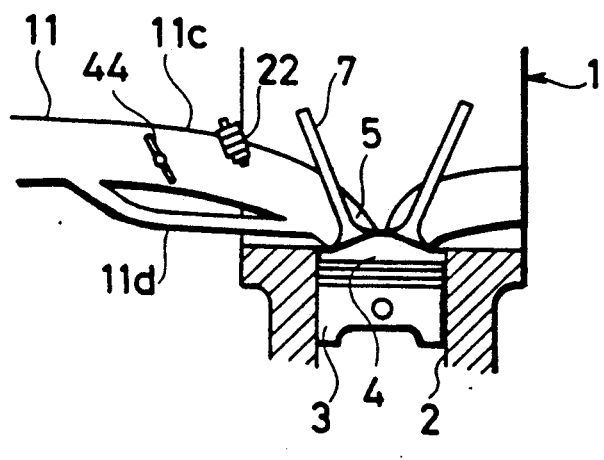
FIG. 19 is a transverse sectional diagram another modified example of the seventh embodiment.

FIG. 18 is a schematic diagram showing a modified example of the seventh embodiment. FIG. 19 is a diagram showing a transverse section of the modified example. In this example, each intake runner 11 comprises a main intake runner 11c extending to inlet ports 5a, 5b of each cylinder 2, a shutter valve 44 for opening and closing the main intake runner 11c, an auxiliary intake runner 11d having a small sectional area for connecting a portion of the intake runner 11 upstream of the shutter valve 44 and a portion thereof near the inlet port 5a. The shutter valve 44 is adapted for closing and opening the main intake runner 11c under a low load and under a high load respectively. In this engine induction system are disposed a single upstream injector 21 and downstream injectors 22. In the example shown in FIG. 18, the upstream injector 21 is disposed upstream of an convergent portion 15 of the intake runners 11. On the other hand, each of the downstream injectors 22 is disposed in the main intake runner 11c downstream of the shutter valve 44.

In this embodiment, the upstream injector 21 is also adapted for injecting fuel when the shutter valve 44 is caused to close the main intake runner 11c under a low load so that the intake air is supplied through the auxilary intake runner 11d. At the time of acceleration, the shutter valve 44 is caused to open the main intake runner 11c and the downstream injector 22 additionally injects fuel. Accordingly, the same effects can be obtained in this embodiment as in the embodiment shown in FIG. 17.

Figure 20:
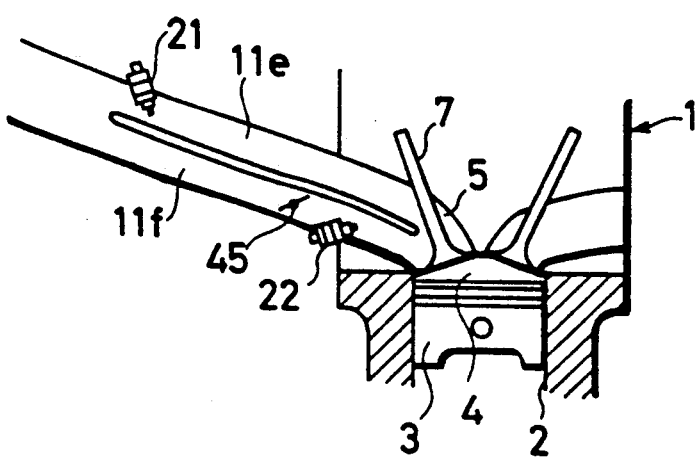
FIG. 20 is a transverse sectional diagram showing a further modified example of the seventh embodiment.

FIGS. 20 is a transverse sectional diagram showing another modified example of the seventh embodiment. In this example, the intake runner 11 is partitioned laterally so as to form a primary and a secondary intake runners 11e, 11f. In the secondary intake runner 11f is disposed a shutter valve 45 for closing the secondary intake runner 11f under a low load, so that the intake air supplied through the primary intake runner 11e to a combustion chamber 4 can swirl in a longitudinal direction of the combustion chamber 4. In this case, if an upstream injector 21 and a downstream injector 21, 22 are disposed in each of the intake runners 11 in the same manner as the example in shown FIGS. 17 and 18, the same effects can be obtained as the foregoing examples.

Figure 21:
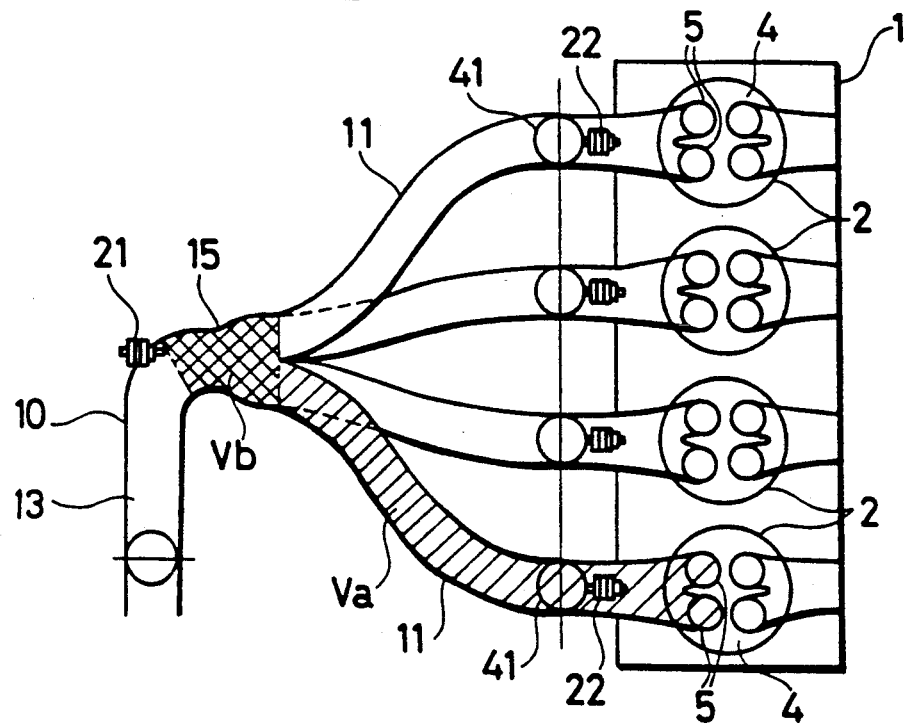
FIG. 21 is a schematic diagram showing a construction of an engine induction system embodying the invention as an eighth embodiment.

FIG. 21 is a schematic diagram showing a construction of an engine induction system embodying the invention as an eighth embodiment. In FIG. 21, intake runners 11 are connected to a convergent portion 15. The convergent portion 15 is so formed that the intake runners 11 are equiangularly connected to a common intake passage 13. Consequently, the intake air can flow into each intake runner 11 under the same condition. A single upstream injector 21 shared by four cylinders 2 is disposed upstream of the convergent portion 15. In this case where the injector 21 shared by four cylinders or less is disposed upstream of the convergent portion 15, the size of one of the intake runners 11 and the position of the single upstream injector 21 are determined in such a manner as to satisfy the condition: The sum of a capacity Va (oblique-lined portion) of one intake runner 11 and a capacity Vb (checkered portion) between the upstream end of the intake runner 11 and the upstream injector 21 is greater than the stroke volume Vs of one of the cylinders 2, that is, Va+Vb>Vs. In this case, it is also desirable that, in addition to the upstream injector 21, downstream injectors 22 and throttle valves 41 be disposed respectively near inlet ports 5 and upstream of the downstream injector 22.

By determining the size of the intake runner 11 and the position of the injector 21 as above, in an engine having not more than four cylinders, even if the injector 21 is disposed upstream of the convergent portion 15, the combustibility can be effectively improved. More specifically, in the engine having not more than four cylinders, the respective intake strokes of the cylinders 2 are not effected simultaneously. Accordingly, during the intake stroke of one cylinder 2, a mixture of fuel and air occupied between the convergent portion 15 and the injector 21 flows only into the intake runner 11 of the very cylinder 2 effecting the intake stroke. Therefore, if the above determinants are so set as to satisfy the inequality (Va+Vb>Vs,) the same effects as the first embodiment or the other foregoing embodiments can be obtained and thereby the combustibility and charging efficiency can be improved.

Further, in a case where the single injector 21 is shared by five cylinders 11 or more and disposed upstream of the convergent portion 15, the size of one intake runner is so determined as to satisfy the following inequality irrespective of the capacity Vb between the upstream end of the intake runner 11 and the injector 21: The capacity Va of one intake runner 11 is greater than the stroke volume Vs of one cylinder (Va>Vs.) More specifically, since the intake strokes of the cylinders partly overlap one another, the intake air between the upstream ends of the intake runners 11 and the injector 21 diverges into the respective intake runners 11 during the overlapping period. To attain effective combustibility under these circumstances, the size of the intake runner 11 is set so as to satisfy the inequality (Va>Vs) to assure a long fuel residual time. Consequently, an improved vaporization of fuel in the intake runner 11 can be obtained.

Figure 22:
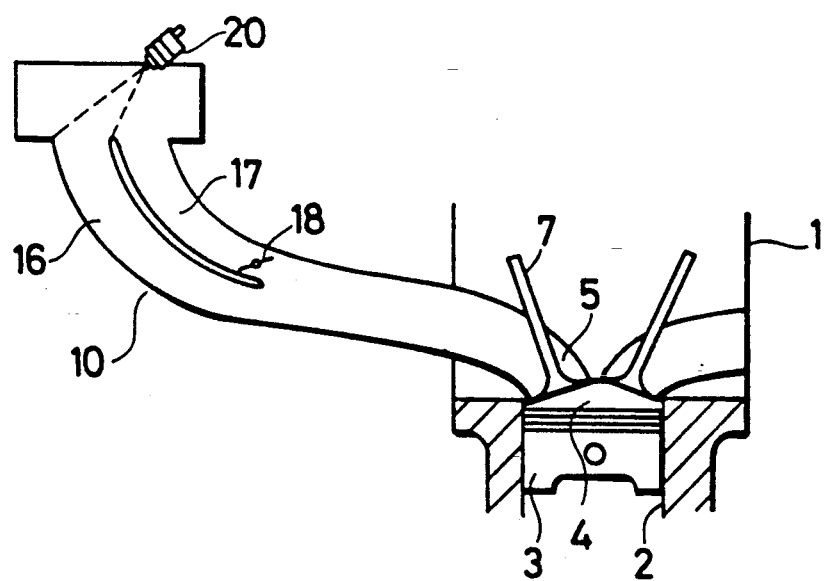
FIG. 22 is a transverse sectional diagram showing a construction of an engine induction system embodying the invention as a ninth embodiment.

FIG. 22 is a transverse sectional diagram showing a construction of an engine induction system embodying the invention as a ninth embodiment. In this embodiment, an induction system 10 comprises a first intake pipe 16 for use in a low speed and a second intake pipe 17 for use in a high speed, the pipes 16, 17 being independent of each other. In FIG. 22, a single injector 20 is disposed at a position sufficiently away from an inlet port 5 and upstream of the intake pipes 16, 17. The injector 20 is directed as to inject fuel to an upstream end of the first intake pipe 16. According to this embodiment, a throttle valve 18 is provided in the second intake pipe 17 for opening and closing it. At a low speed where the throttle valve 18 closes the second intake pipe 17, the fuel injected from the injector 20 is flowed into the first intake pipe 16. On the other hand, at a high speed where the throttle valve 18 does not close the second intake pipe 17, the fuel injected from the injector 20 is diffused into both the first intake pipe 16 and the second intake pipe 17 by air currents flowing into the first intake pipe 16 and the second intake pipe 17. Consequently, the fuel can be further mixed with the air. This embodiment also demonstrates the same basic effects as the foregoing embodiments, such a the first embodiment.

Figure 23:
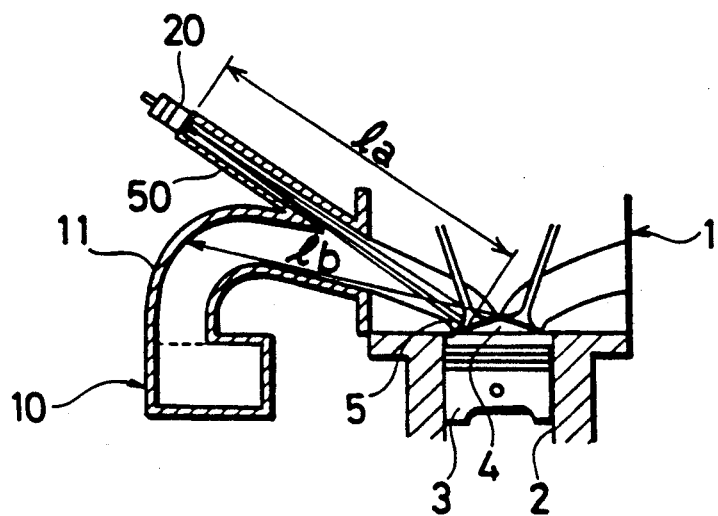
FIG. 23 is a transverse sectional diagram showing an engine induction system embodying the invention as a tenth embodiment.
Figure 24:
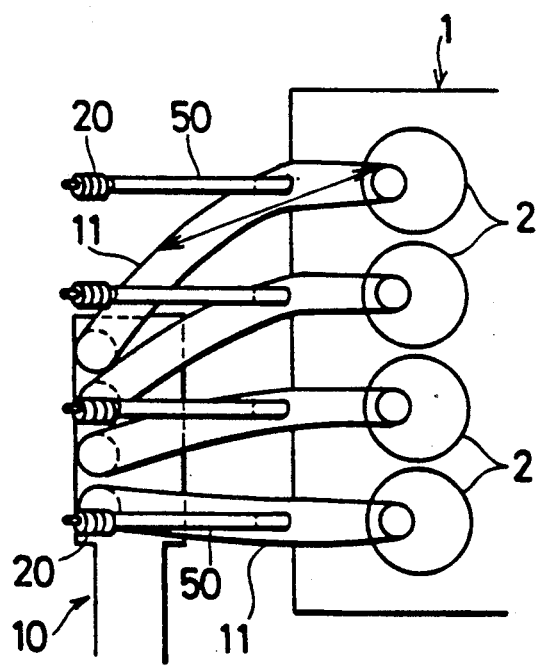
FIG. 24 is a schematic diagram showing a construction of the engine induction system shown in FIG. 23.

FIG. 23 is a transverse sectional diagram showing an engine induction system embodying the invention as a tenth embodiment. FIG. 24 is a schematic diagram showing a construction of the engine induction system shown in FIG. 23. This embodiment exemplifies a construction effective in the case where it is difficult to give the sufficient length to an intake runner 11. In this construction, a fuel supply tube 50 exclusively adapted for conveying fuel to an inlet port 5 is linearly formed and diverges from each intake runner 11.

More specifically, as mentioned above, in order to obtain the advantageous effects, such as a prolonged residual time of fuel, in the construction where an injector is diposed in an induction system, the following condition should be satisfied. That is, the runner volume between an inlet port and the injector is greater than the stroke volume of the cylinder to which the intake runner is connected. Accordingly, it is required that the injector be disposed sufficiently away from the inlet port. In this case, it is desirable that the intake runner between the inlet port and the injector be formed substantially linearly so as to possibly eliminate the likelihood of fuel deposition onto the wall of the intake runner. However, there are cases where it is difficult to provide the intake runner with a long linear portion due to a restriction in layout.

Accordingly, in this embodiment, intake runners 11 are curved to reduce the entire size of the engine induction system. Consequently, the length 1b of the linear portion of the intake runner 11 extending up to the inlet port 5 can be relatively shortened. Moreover, the fuel supply tube 50 diverged from each intake runner 11 is formed with a linear portion. The injector 20 is disposed at an upstream end of the fuel supply tube 50. The fuel injected from the injector 20 is supplied linearly to the inlet port 5.

Furthermore, the distance 1a between the inlet port 5 and the injector 20 is greater than the maximum linear distance 1b of the intake runner 11. More preferably, the distance 1a is set greater than the length of the intake runner 11 having the capacity equal to the stroke volume of the cylinder 2.

Accordingly, the engine induction system of this embodiment can be formed into a compact size. Further, by providing the linear fuel supply tube 50 exclusive in use for conveying the fuel, the injector 20 can be disposed sufficiently away from the inlet port 5 in the linear direction. Accordingly, the fuel injected from the injector 20 is linearly supplied to the inlet port 5, thus suppressing the likelihood of the fuel deposition onto the wall of the supply tube 50. Also, the vaporization, and atomization of fuel can be sufficiently accomplished until the fuel reaches the inlet port 5, thereby assuring the advantageous effects such as an improvement in the combustibility.

Next, five embodiments or eleventh embodiment to fifteenth embodiments will be described below. Each engine induction system of these embodiments comprises an upstream injector, a downstream injector, and an exhaust gas recirculation regulating device.

Figure 25:
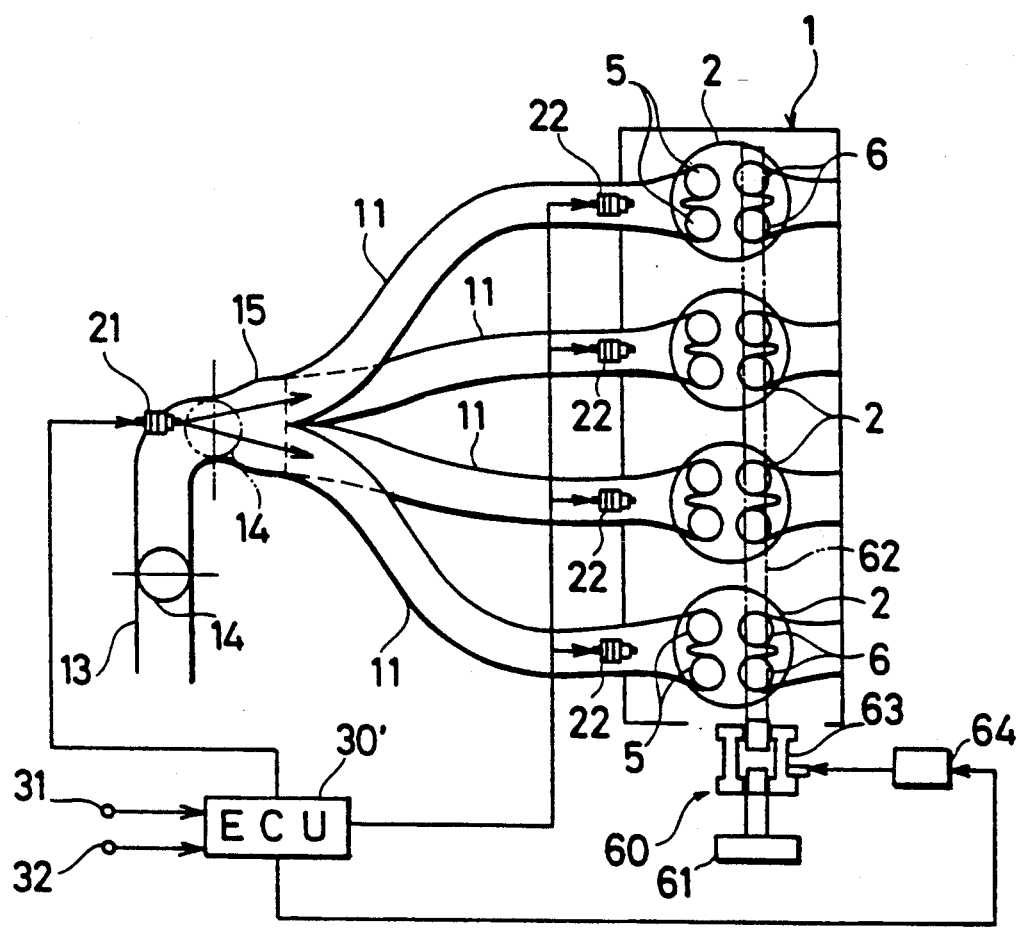
FIG. 25 is a schematic diagram showing a construction of an engine induction system provided with an exhaust gas recirculation regulating device.
Figure 26:
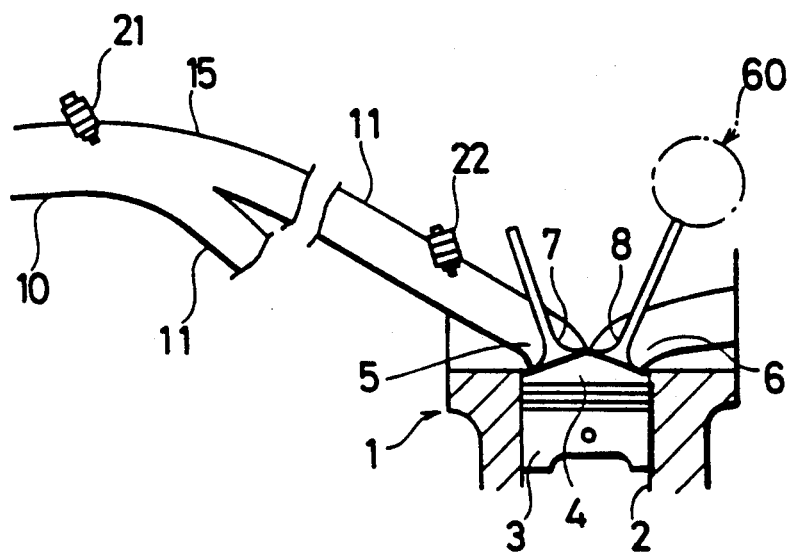
FIG. 26 is a transverse sectional diagram showing the engine induction system shown in FIG. 25.
Figure 27:
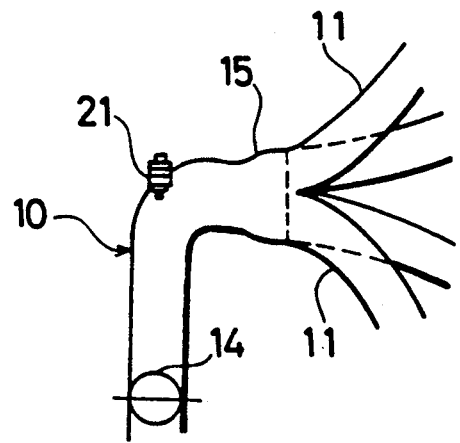
FIG. 27 is a diagram partially showing a modified example of the engine induction system shown in FIG. 25, wherein an upstream injector is directed to an upstream throttle valve.
Figure 28:
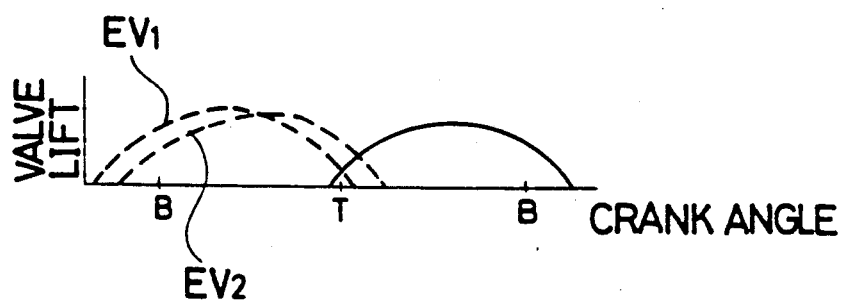
FIG. 28 is a graph showing opening timing of intake and exhaust valves, wherein a horizontal axis represents the crank angle and a vertical axis represents valve lift of the intake and the exhaust valves.
Figure 29:
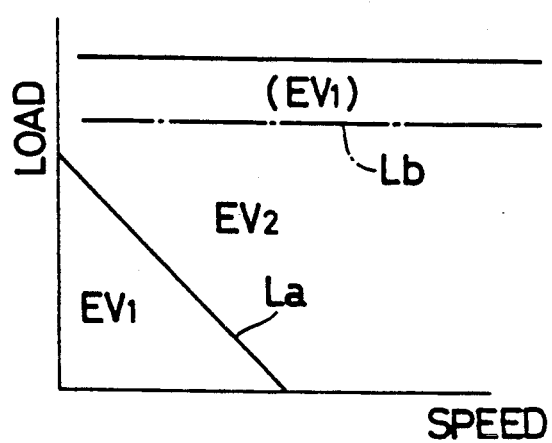
FIG. 29 is a graph showing an engine load operating zone for exhaust valve opening timings EV1, EV2, wherein a horizontal axis represents an engine speed and a vertical axis represents an engine load (TVO)
Figure 30:
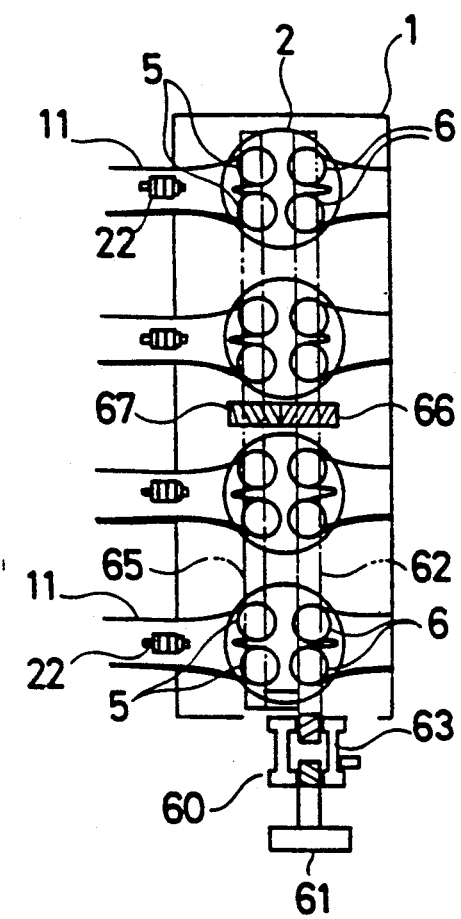
FIG. 30 is a diagram partially showing the engine induction system shown in FIG. 25.

The eleventh embodiment of the invention will be described with reference to FIGS. 25 to 30. FIG. 25 is a schematic diagram showing a construction of an engine induction system having an engine exhaust recirculation regulating device. FIG. 26 is a transverse sectional diagram showing the engine induction system shown in FIG. 25. FIG. 27 is a diagram partially showing a modified example of the engine induction system shown in FIG. 25, wherein an upstream injector is directed to an upstream throttle valve. FIG. 28 is a graph showing opening timing of an intake valve and an exhaust valve, wherein the horizontal axis represents the crank angle and the vertical axis represents the valve lift of the intake valve and the exhaust valve. FIG. 29 is a graph showing an engine load operating zone for exhaust valve opening timings EV1, EV2, wherein the horizontal axis represents the engine speed and the vertical axis represents the engine load(TVO.). FIG. 30 is a diagram partially exploded showing the engine induction system shown in FIG. 25.

In the eleventh embodiment, four cylinders 2 are formed in an engine main body 1. For each cylinder 2 is provided a piston, a combustion chamber, an inlet port 5, an exhaust port 6, an intake valve 7 and an exhaust valve 8.

On the other hand, an intake manifold 10 comprises four intake runners 11 leading to the cylinders 2 respectively, a common intake passage 13, a convergent portion 15 between the intake runners 11 and the common intake passage 13 to which the four intake runners 11 are equiangularly convergedly connected, the common intake passage 13 having a throttle valve 14. This construction is the same as those of the foregoing embodiments.

In the intake manifold 10 are disposed an upstream injector 21 and a downstream injector 22, both as fuel supplying means. The upstream injector 21 is so positioned that the runner volume between the upstream injector 21 and the inlet port 5 is greater than the stroke volume of the cylinder 2 to which the intake runner 11 is connected. In this embodiment, the upstream injector 21 is disposed upstream of the convergent portion 15 of the intake runners 11 so that the fuel injected from the upstream injector 21 can be sharedly supplied to each of the cylinders 2. On the other hand, the downstream injector 22 is disposed near the inlet port 5 of each intake runner 11.

In the case where the upstream injector 21 is disposed upstream of the convergent portion 15, the throttle valve 14 may be disposed upstream of the upstream injector 21, e.g., in a position shown by a solid line in FIG. 25. Alternatively, the throttle valve 14 may be disposed downstream of the upstream injector 21 in a position shown by a phantom line in FIG. 25. Further, in order to further mix the fuel injected from the upstream injector 21 with the intake air passing through the throttle valve 14, the upstream injector 21 may be provided in such a direction as to inject fuel to the throttle valve 14 as shown in FIG. 27.

Moreover, the engine is provided with exhaust gas recirculation regulating device for regulating the amount of recirculating exhaust gas into the intake runners 11. In this embodiment, the exhaust gas recirculation regulating device includes an exhaust valve timing changing device 60 for changing the opening and closing timing of the exhaust valve 8. The exhaust valve timing changing device 60 is provided on the exhaust valve side and includes a cam pulley 61, a cam shaft 62, and a regulating member 63 provided between the cam pulley 61 and the cam shaft 62 for phase-controllably connecting the cam pulley 61 and the cam shaft 62 to each other through a helical gear. The regulating member 63 is actuated by an actuator 64. By actuating the regulating member 63, the opening timing of the exhaust valve 8 switches between a first opening timing EV1 and a second opening timing EV2 as shown in the graph shown in FIG. 28. At the first opening timing EV1, opening of the exhaust valve 8 overlaps with that of the intake valve 7 for a relatively shorter period of time. Hereinafter, such overlaps of openings of the intake valve 7 and the exhaust valve 8 are referred to as a valve overlap. On the contrary, at the second opening timing EV2, the valve overlap lasts for a longer period of time than at the first opening timing EV1. The amount of exhaust gas is controlled in accordance with a change in the valve overlap of the intake and the exhaust valves 7, 8.

The fuel injection from the upstream and the downstream injectors 21, 22 and the actuation of the exhaust valve timing changing device 60 are controlled by an exhaust control unit (ECU) 30'. The ECU 30' receives an engine load signal 31 from a sensor for detecting the throttle opening amount as engine load, and an engine speed signal 32 from a sensor for detecting the engine speed or other signals.

The ECU 30' controls the exhaust valve timing changing device 60 in accordance with an operating condition detected based on the signals 31, 32. For example, the ECU 30' controls the exhaust valve timing changing device 60 based on engine load zones shown in FIG. 29. More specifically, in order to assure a reduced pumping loss, the internally recirculated exhaust gas amount is increased at least in light and medium engine load operating zones. However, in an idle operating zone and a zone close to the idle operating zone where both the engine speed and the engine load are below a line La, the flow rate of the intake air is low. Accordingly, the internally recirculated exhaust gas amount tends to become larger despite a shorter valve overlapping period. Therefore, the exhaust valve opening timing is set at the first opening timing EV1 so as to avoid an excessive increase of the internally recirculated exhaust gas amount. In the zone between the lines La and Lb, i.e., in the light and the medium load operating zones, the exhaust valve opening timing is set at the second opening timing EV2. In a zone above the line Lb, i.e., in a high load operating zone, the exhaust valve opening timing is set at the first opening timing EV1 so as to reduce the internally recirculated exhaust gas amount to consequently improve the power output of the engine. Here it should be noted that, in an engine provided with means for upgrading the charging efficiency, such as a supercharger, the exhaust valve opening timing may be set at the second opening timing EV2 so as to facilitate scavenging of the engine or the like even in the high load operating zone.

On the other hand, ECU 30' controls the injectors 21, 22 as follows. The ratio of the fuel supply from the upstream injector 21 to that from the downstream injector 22 is increased at least in the light and medium load operating zone where the internally recirculated exhaust gas amount becomes larger. For example, in the normal operating condition in the light and medium load operating zone including the idle operating zone, i.e., in any operating condition other than acceleration, the upstream injector 21 is caused to supply all the fuel to the cylinders 2 of the engine. In the time of acceleration when high responsibility of fuel supply is required, the upstream injector 21 supplies a standard amount of fuel and the downstream injector 22 supplies the supplementary amount of fuel. Further, in the high load operating zone where the fuel injection from the upstream 21 alone cannot meet the fuel supply required by the combustion chamber, both the upstream injector 21 and the downstream injector 22 are allowed to inject fuel at appropriate ratios.

In this embodiment, at least in the light and the medium load operating zones excluding the idle operating zone, the exhaust valve opening timing is set at the second opening timing EV2, so that the valve overlap lasts for a longer period of time. Consequently, the internally recirculated exhaust gas amount will be increased. The increased exhaust gas leads to a decrease in nitrogen oxides (NOx) and reduction in the pumping loss because the exhaust gas serves to reduce the suction pressure of the intake air.

Further, since the fuel supply is effected by the upstream injector 21 in the light and the medium load operating zones, satisfactory combustibility can be obtained even under the circumstances where the internally recirculated exhaust gas is becoming larger. More specifically, assuming that the downstream injector 21 is to inject more fuel than the upstream injector 22, most of the injected fuel reaches the combustion chamber within a short period of time, resulting in insufficient atomization, vaporization, and diffusion of fuel in the combustion chamber. Accordingly, in the case where the large amount of internally recirculated exhaust gas, which is inert gas, is present in the combustion chamber, an ignition failure is liable to occur.

On the contrary, when the fuel injection is effected by the upstream injector 21, the atomization and the vaporization of the fuel is furthered in the intake runners 11 since the injector 21 is away from the combustion chamber by a lengthy distance. Accordingly, the fuel is sufficiently mixed with the air and internally recirculated exhaust gas and be supplied into the combustion chamber, thereby suppressing the likelihood of the ignition failure with a larger amount of internally recirculated exhaust gas present.

Particularly, in the operating zone where the valve overlap lasts for a longer period of time so that the internally recirculated exhaust gas increases, the fuel injection from the upstream injector 21 becomes effective. Even in other operating zones, such as the idle operating zone, the upstream injector 21 mainly effects the fuel injection, improving the atomization and the vaporization of fuel and thereby improving the combustibility.

The valve opening timing changing device 60 constituting the exhaust gas recirculation regulating device is adapted for changing the opening timing of the exhaust valve 8 in the embodiments shown in FIGS. 25, 26. However, it may be appropriate that the opening timing of the intake valve 7 be changed so as to regulate the valve overlapping period of the intake and the exhaust valves 7, 8 as an embodiment shown in FIG. 33 to be described below.

Moreover, the opening timing of both the intake valve 7 and the exhaust valve 8 may be made changeable. For example, as shown in FIG. 30, a regulating member 63 is disposed between a cam pulley 61 for exhaust valves and a cam shaft 62 for exhaust valves. A cam shaft 65 for intake valves is connected to the cam shaft 62 by a way of gears 66, 67 so that the cam shaft 65 and the cam shaft 62 can be operably connected with each other. Thereby, opening timing of the intake valve 7 and the exhaust valve 8 can be regulated in the same direction, e.g., in the horizontal direction in the graph of FIG. 28. With this construction, duration of the valve overlap of the intake and the exhaust valves 7, 8 is unchanged. However, the timing of the valve overlap is changed. For example, if the timing of the valve overlap is delayed, the internally recirculated exhaust gas will be increased.

Figure 31:
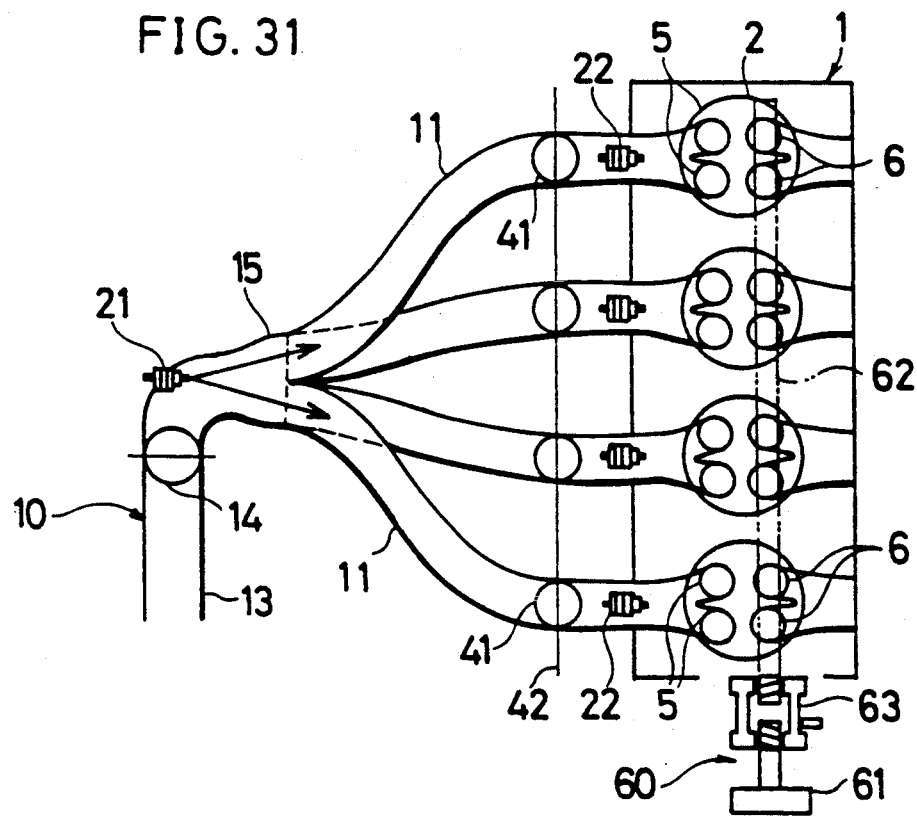
FIG. 31 is a schematic diagram showing a construction of an engine induction system provided with an exhaust gas recirculation regulating device, embodying the invention as a twelfth embodiment.

FIG. 31 is a schematic diagram showing a construction of an engine induction system embodying the invention as a twelfth embodiment in which an exhaust gas recirculation regulating device is provided. In this embodiment, there are also provided an upstream injector 21, a downstream injector 22, a valve opening timing changing device 60 constituting an exhaust gas recirculation regulating device similar to the eleventh embodiment. In addition, a throttle valve (downstream throttle valve) 41 mounted to a common valve shaft 42 is disposed in a downstream portion of each of intake runners 11 between the upstream injector 21 and the downstream injector 22. Further, an upstream throttle valve 14 is disposed in a common intake passage 13 upstream of an convergent portion 15 in which the intake runners 11 are equiangularly convergedly connected to the common intake passage 13.

Opened angles of both the downstream and the upstream throttle valves 41, 14 are small under a light load and become larger with acceleration. For example, opened angles of the downstream and the upstream throttle valves 41, 14 are actuated in accordance with the movement of an unillustrated acceleration pedal.

In this embodiment, the intake runner 11 is throttled by the downstream throttle valve 41 in light and medium load operating zones. In this state, fuel is injected from the upstream injector 21 and atomized and vaporized through the intake runner 11 with flowing with the intake air. Furthermore, when the mixture of fuel and air passes through the downstream throttle valve 41, the flow rate of the mixture is speeded up, thereby further improving the vaporization of fuel and considerably enhancing the mixing of fuel, air, and internally recirculated exhaust gas. Accordingly, even with a large amount of internally recirculated exhaust gas, the combustibility can be further enhanced.

Further, in addition to the downstream throttle valve 41, the upstream throttle valve 14 can be disposed for mainly regulating the amount of intake air. In this case, the downstream throttle valve 41 can be made effective for further mixing the fuel with the air and internally recirculated exhaust gas. Moreover, if the upstream injector 21 is disposed near the upstream throttle valve 14, the fuel injected from the upstream injector 21 is diffused by the air current flowing through the throttle valve 14, thereby further being vaporized until the fuel reaches the downstream throttle valve 41.

It should be noted that the upstream throttle valve 14 may be omitted if the downstream throttle valve 41 is made to regulate the amount of intake air.

Figure 32:
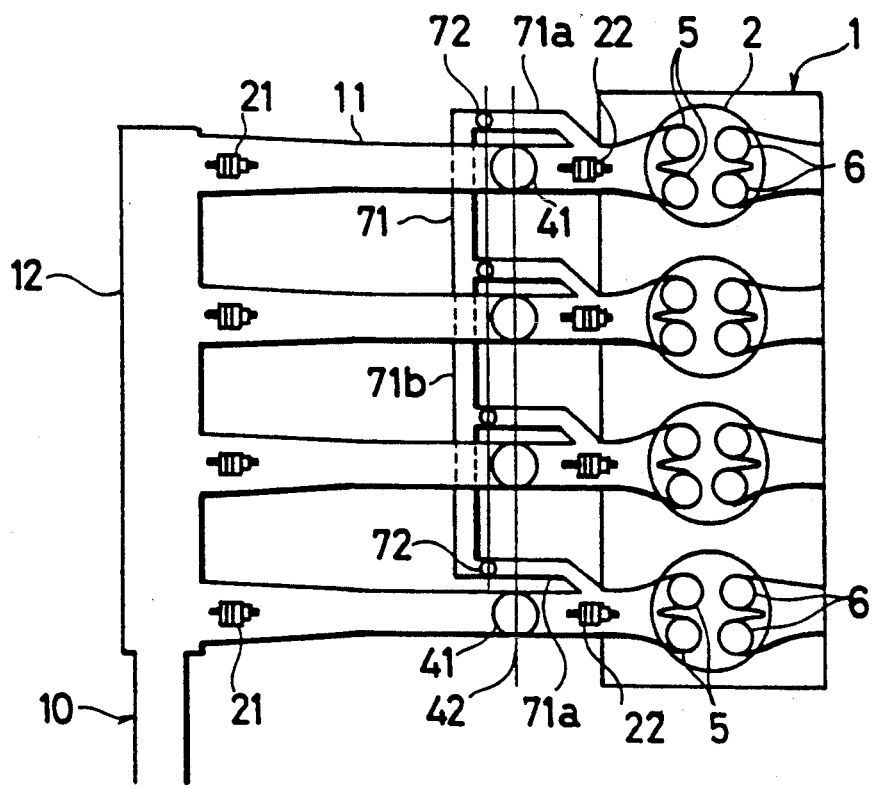
FIG. 32 is a schematic diagram showing a construction of an engine induction system having an exhaust gas recirculation regulating device, embodying the invention as a thirteenth embodiment.

FIG. 32 is a schematic diagram showing a construction of an engine induction system provided with an exhaust gas recirculation regulating device embodying the invention as a thirteenth embodiment. In this embodiment, there is provided a throttle valve 41 in each of intake runners 11 between an upstream injector 21 and a downstream injector 22. In addition, the intake runners 11 are communicated with one another through a communicating conduit 71. The communicating conduit 71 comprises a branched conduit 71a leading to a position of each intake runner 11 downstream of the throttle valve 41 and a main communicating conduit 71b communicating the branched conduits 71a with one another. In each branched conduit 71a is disposed a control valve 72 for controlling the amount of exhaust gas flowing through the communicating conduit 71. The control valve 72 is actuated in accordance with an operating condition by an unillustrated actuator. For example, the control valve 72 closes the branched conduit 71a in the idle operating zone or its neighboring zones. The control valve 72 may close the branched conduit 71a under a high load depending on the type of the engine. The control valve 72 opens the branched conduit 71a in the light and the medium load operating zones excluding the idle operating zone and its neighboring zones.

With this construction, even under the condition that the residual exhaust gas is prevented from flowing back to each intake runner 11 by the throttle valve 41, the communicating conduit 71 allows the residual exhaust gas to flow back to the intake runner 11. Accordingly, the communicating conduit 71 and the control valve 72 cooperate to regulate the amount of exhaust gas. With this construction, it is sufficient that intake and exhaust valves are fixedly set at such opening timings that the valve overlap lasts for an appropriate period of time.

Further, in the thirteenth embodiment, an upstream end of each intake runner 11 is connected to a surge tank 12 and the upstream injector 21 is disposed near the upstream end of each intake runner 11. However, a single upstream injector 21 may be disposed upstream of an convergent portion of the intake runners 11 similarly to the eleventh embodiment.

Moreover, it should be noted that in the eleventh embodiment and the twelfth embodiment, the upstream injector 21 may be disposed near the upstream end of each intake runner 11 similarly to the thirteenth embodiment.

Figure 33:
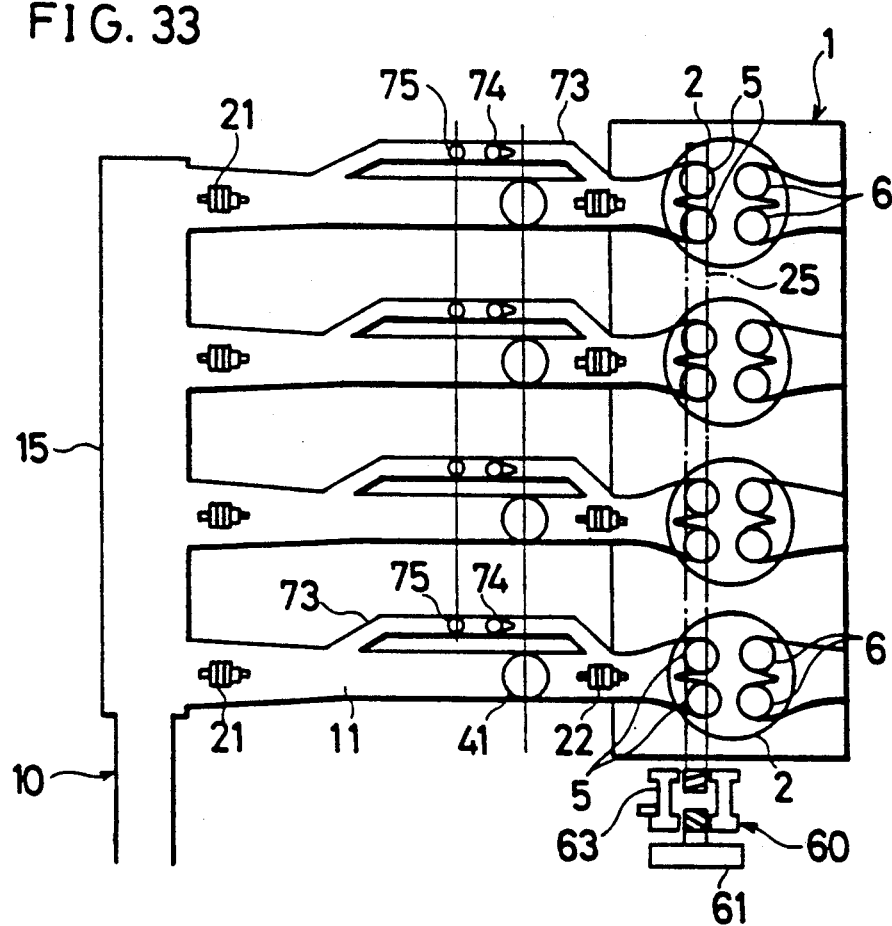
FIG. 33 is a schematic diagram showing a construction of an engine induction system having an exhaust gas recirculation regulating device.
Figure 34:
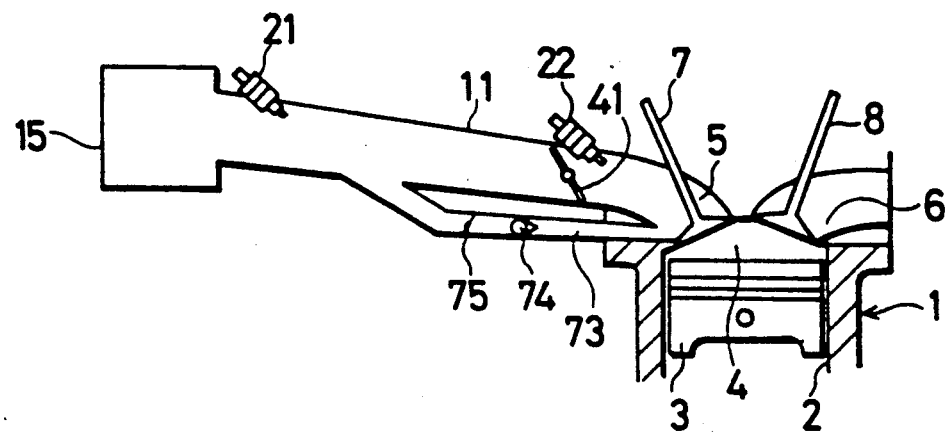
FIG. 34 is a transverse sectional diagram showing the engine induction system shown in FIG. 33.

FIGS. 33 and 34 show a fourteenth embodiment of the invention. FIG. 33 is a schematic diagram showing a construction of an engine induction system provided with an exhaust gas device. FIG. 34 is a transverse sectional diagram showing the engine induction system shown in FIG. 33. In this embodiment, there are provided an upstream injector 21, a downstream injector 22, a throttle valve 41 disposed in each of intake runners 11, and a valve opening timing changing device 60 constituting the exhaust gas recirculation regulating device. In addition, in each intake runner 11 is provided an exhaust gas recirculation conduit 73 for introducing the exhaust gas to an upstream portion of the intake runner 11. Here, the upstream portion refers to a portion of the intake runner 11 which is upstream of the throttle valve 41 and the downstream portion refers to a portion of the intake runner 11 which is downstream of the throttle valve 41. Each exhaust gas recirculation conduit 73 is adapted for communicating the above-mentioned upstream portion and the downstream portion of the intake runner 11 to bypass the throttle valve 41. In the exhaust gas recirculation conduit 73 is disposed a check valve 74 for allowing the exhaust gas to flow only into the upstream portion, and a control valve 75 for regulating the amount of internally recirculated exhaust gas. The control valve 75 is actuated in accordance with the operating condition by an unillustrated actuator. For example, the control valve 75 closes the exhaust gas recirculation conduit 73 in the idle operating zone or its neighboring zones. The control valve 75 may close the exhaust gas recirculation conduit 73 under a high load depending on the type of the engine. The control valve 75 opens the exhaust gas recirculation conduit 73 in the light and the medium load operating zones excluding the idle operating zone and its neighboring zones.

With this construction, in the light and medium operating zones, the valve opening timing changing device 60 causes the valve overlap to last for a longer period of time, and thus the amount of internally recirculated exhaust gas becomes larger. Simultaneously, the internally recirculated exhaust gas is introduced to the upstream portion of the intake runner 11 bypassing the throttle valve 41 through the exhaust gas recirculation conduit 73. In this state, fuel is injected from the upstream injector 21. In this manner, mixing of the fuel with the internally recirculated exhaust gas can be started in the upstream portion of the intake runner 11 near the upstream injector 21. The fuel, air, and internally recirculated exhaust gas introduced in the upstream portion of the intake runner 11 through the exhaust gas recirculation conduit 73 are sufficiently mixed with one another while flowing down the intake runner 11. The fuel will further vaporize with the heat from the internally recirculated exhaust gas. As a result, even with a large amount of internally recirculated exhaust gas present, the combustibility can be further enhanced.

Figure 35:
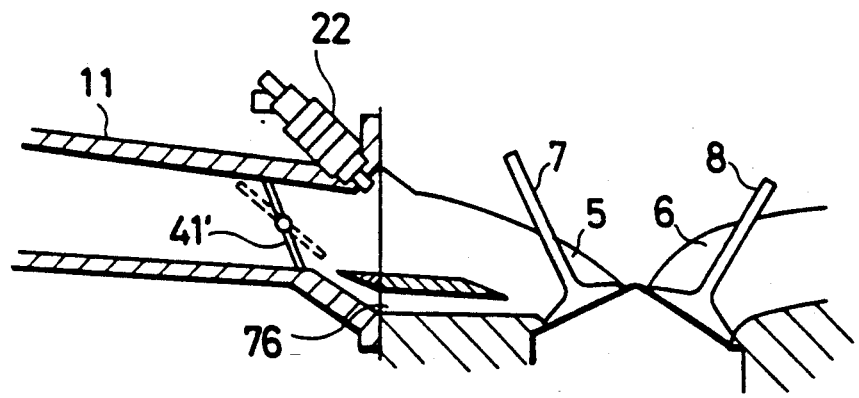
FIG. 35 is a transverse sectional diagram showing a modified example of the fourteenth embodiment.

FIG. 35 is a transverse sectional diagram explodedly showing a modified example of the fourteenth embodiment. In this modification, a throttle valve 41' is disposed in an intake runner 11. An exhaust gas recirculation conduit 76 is formed in the intake runner 11 downstream of the throttle valve 41'. The exhaust gas recirculation conduit 76 is adapted only for regulating the amount of intake air, but also for regulating the amount of internally recirculated exhaust gas introduced in the upstream portion of the intake runner 11. More specifically, an upstream end of the exhaust gas recirculation conduit 76 opens to the intake runner 11 near the throttle valve 41'. When the throttle valve 41' is put in a complete closing position, the exhaust gas recirculation conduit 76 is blocked by the throttle valve 41', so that the internally recirculated exhaust gas cannot be introduced to the upstream portion of the intake runner 11. As the throttle valve 41' is put in an opening position, the exhaust gas recirculation conduit 76 comes to more communication with the upstream portion of the intake runner 11.

Figure 36:
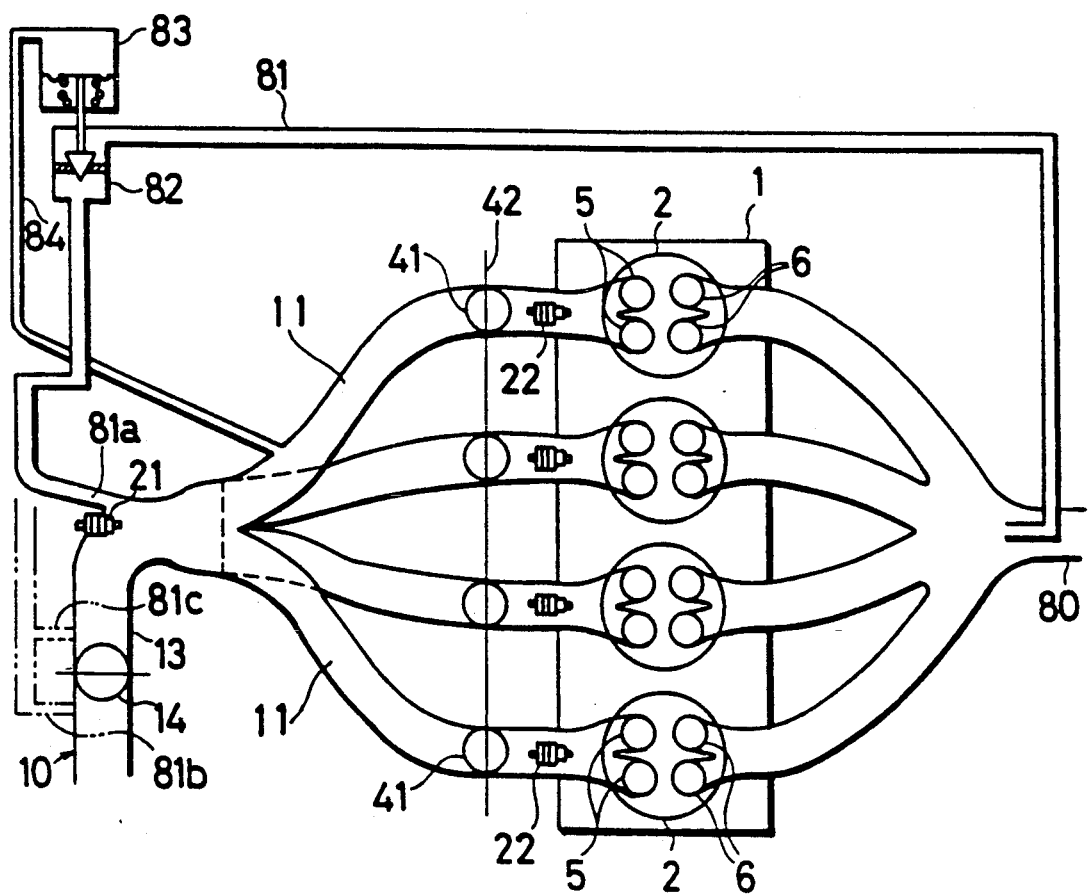
FIG. 36 is a schematic diagram showing a construction of an engine induction system provided with an exhaust gas recirculation regulating device, embodying the invention as a fifteenth embodiment.

FIG. 36 is a schematic diagram showing a construction of an engine induction system provided with an exhaust gas external recirculation device embodying the invention as a fifteenth embodiment. In this embodiment, there are provided an upstream injector 21, a downstream injector 22, a downstream throttle valve 41 disposed in each intake runner 11, and an upstream throttle valve 14 disposed in a common intake passage 13. In addition, there is provided an exhaust gas external recirculation conduit 81 for externally recirculating exhaust gas into a portion of an intake manifold 10 which is upstream of the downstream throttle valve 41.

An inlet of the exhaust gas external recirculation conduit 81 is opened to an exhaust pipe 80 and an outlet 81a of the conduit 81 is opened to a portion of the intake manifold 10 which is upstream of the downstream throttle valve 41. In the conduit 81 shown by solid lines in FIG. 36, the outlet 81a of the conduit 81 is opened to a portion of the intake manifold 10 which is near the upstream injector 21 disposed upstream of an convergent portion 15. In a halfway of the conduit 81 is disposed a control valve 82. The control valve 82 is actuated by a diaphragm-type actuator 83 in accordance with the pressure of the intake air introduced through a pressure conduit 84 to the actuator 83 to regulate the amount of exhaust gas in the exhaust gas external recirculation conduit 81. Further, an unillustrated pressure control valve may be disposed in the pressure conduit 84 if necessary. The pressure control valve may be controlled in accordance with the operating condition to regulate the amount of exhaust gas.

In this embodiment as well, the exhaust gas recirculated through the exhaust gas external recirculation conduit 81 is introduced to an upstream portion of the intake manifold 10 so that mixing of the fuel injected from the upstream injector 21 with externally recirculated exhaust gas can be started in the upstream portion of the intake manifold 10. The fuel, air and externally recirculated exhaust gas are sufficiently mixed with one another while flowing down the intake runner, and the fuel will further vaporize with the heat from the exhaust gas. Particularly, in the case where the outlet 81a of the conduit 81 is opened to the portion of the intake manifold 10 which is near the upstream injector 21, mixing of the fuel with the air and the externally recirculated exhaust gas can be effectively done.

Further, the advantageous effects as described above can be obtained even in the case where the outlet 81a of the conduit 81 is opened to a portion of the intake manifold 10 which is upstream of and near the upstream throttle valve 14 as represented by a reference numeral 81b, or downstream of and near the upstream throttle valve 14 as represented by a reference numeral 81c. In this case in which the outlet 81a of the conduit 81 is opened to the intake manifold 10 near the upstream throttle valve 14, the externally recirculated exhaust gas and air can be further mixed with each other by air currents generated in the upstream throttle valve 14.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An induction system for use in an engine including a cylinder having an inlet port and a predetermined stroke volume comprising:
    an intake passage connected to the inlet port;
    an injector provided in the intake passage for injecting fuel in an intake plenum between the injector and the inlet port, the injector being disposed in such a position that the volume of the intake plenum is greater than the predetermined stroke volume.

2. An induction system as defined in claim 1 wherein the engine has a plurality of cylinders having inlet ports respectively, the induction system comprises a common intake passage, a plurality of intake passages connected to the respective inlet ports, the upstream ends of the plurality of intake passages being connected to the common intake passage with the plurality of intake passages being converged to the common passage equiangularly with respect to the intake direction of the common passage.

3. An induction system as defined in claim 1 wherein the intake passage between the injector and the inlet port is formed linearly.

4. An induction system as defined in claim 3 further comprising fuel diffusing means for diffusing the fuel injected from the injector in a predetermined operating condition.

5. An induction system for use in an engine including a cylinder having an inlet port and a predetermined stroke volume comprising:
    an intake passage connected to the inlet port;
    an upstream injector provided in the intake passage for injecting fuel in the intake plenum between the injector and the inlet port, the upstream injector being disposed in such a position that the volume of the intake plenum is greater than the predetermined stroke volume; and
    a downstream injector provided in the intake passage near the inlet port for injecting fuel.

6. An induction system as defined in claim 5 wherein the intake passage is provided with a throttle valve between the upstream injector and the downstream injector.

7. An induction system as defined in claim 5 wherein the engine has a plurality of cylinders having inlet ports respectively, the induction system comprises a common intake passage, a plurality of intake passages connected to the respective inlet ports, the upstream ends of the plurality of intake passages being connected to the common intake passage with the plurality of intake passages being converged to the common passage equiangularly with respect to the intake direction of the common passage induction.

8. An induction system as defined in claim 5 wherein the intake passage is partitioned into a plurality of paths, one of which is provided with a shutter valve for opening and closing the path in accordance with an operating condition, and the downstream injector is provided downstream of the shutter valve.

9. An induction system as defined in claim 5 wherein the upstream injector starts the injecting of fuel after an elapse of a predetermined time following opening of the inlet port.

10. An induction system as defined in claim 5 further comprising:
an exhaust gas recirculation regulating means for regulating the amount of recirculating exhaust gas into the induction system;
controlling means for controlling the exhaust gas recirculation regulating means and the upstream injector so as to increase the amount of recirculating exhaust gas and increase the ratio of fuel amount injected from the upstream injector to fuel amount injected from the downstream injector in a light load operating zone and a medium load operating zone of the engine.

11. An induction system as defined in claim 10 wherein the exhaust gas recirculation regulating means regulates the amount of exhaust gas recirculating into the induction system from the cylinder.

12. An induction system as defined in claim 11 wherein the exhaust gas recirculation regulating means comprises valve opening timing changing means for changing the opening timing of at least one of the inlet valve and the exhaust valve.

13. An induction system as defined in claim 11 wherein a throttle valve is provided in the intake passage between the upstream injector and the downstream injector.

14. An induction system as defined in claim 13 wherein the engine has a plurality of cylinders having inlet ports respectively, the induction system comprises a common intake passage, a plurality of intake passages connected to the respective inlet ports, the respective upstream ends of the plurality of intake passages being connected to the common intake passage with the plurality of intake passages being converged to the common passage equiangularly with respect to the intake direction of the common passage, a second throttle valve provided upstream of the convergent portion.

15. An induction system as defined in claim 13 wherein the engine has a plurality of cylinders having inlet ports respectively, the induction system comprises a plurality of intake passages, and a communicating passage for communicating the plurality of intake passages with each other, the communicating passage being positioned downstream of the throttle valves provided in the respective intake passages.

16. An induction system as defined in claim 10 wherein the intake passage is provided with a throttle valve between the upstream injector and the downstream injector and exhaust gas recirculation means for introducing exhaust gas into an intake plenum upstream of the throttle valve.

17. An induction system as defined in claim 16 wherein the exhaust gas recirculation means introduces exhaust gas remaining in the cylinder into the intake plenum upstream of the throttle valve.

18. An induction system as defined in claim 16 wherein the engine has an exhaust gas pipe for discharging external exhaust gas from the cylinder, the exhaust gas recirculation means has an exhaust gas recirculating conduit one end opening of which is communicated with the exhaust gas pipe of the engine, and the other end opening of which is communicated with an intake plenum upstream of the throttle valve so that the external exhaust gas is recirculated into the intake plenum upstream of the throttle valve.

19. An induction system as defined in claim 18 wherein the other end opening of the exhaust gas recirculating conduit is disposed near the upstream injector.

20. An induction system for use in an engine including a plurality of cylinders having inlet ports respectively comprising:
a plurality of intake passages connected to the respective inlet ports;
a common intake passage to which upstream ends of the plurality of intake passages is connected equiangularly with respect to the intake direction of the common intake passage;
an upstream injector provided in the connecting portion or upstream of the connecting portion; and
a plurality of downstream injectors provided near the respective inlet ports.

21. An induction system for use in an engine including not more than four cylinders having inlet ports and a predetermined stroke volume comprising:
intake passages connected to the respective inlet ports;
a common intake passage to which upstream ends of the intake passages are connected; and
an injector provided upstream of the connecting portion; the injector being disposed in such a position that a sum of the volume of the intake portion between the inlet port and the connecting portion and the volume of the intake portion between the connecting portion and the injector is greater than the predetermined stroke volume.

22. An induction system for use in an engine having more than four cylinders having inlet ports and a predetermined stroke volume comprising:
intake passages connected to the respective inlet ports;
a common intake passage to which upstream ends of the intake passages are connected;
an injector provided upstream of the connecting portion, the injector being disposed in such a position that the volume of the intake portion between the inlet port and the connecting portion is greater than the predetermined stroke volume.

23. An induction system for use in an engine having a cylinder having an inlet port comprising:
an intake passage connected to the inlet port, the intake passage having a linear portion and a curved portion, the linear portion having one end connected to the inlet port;
a fuel supply tube branched from the intake passage exclusively for supplying fuel; and
an injector provided in the fuel supply tube for injecting fuel;
the fuel supply tube being so formed that the fuel injected from the injector reaches linearly the inlet port and the distance between the inlet port and the injector is greater than the maximum linear distance of the intake passage from the inlet port.

24. An induction system as defined in claim 23 wherein the cylinder has a predetermined stroke volume and the distance between the injector and the inlet port is greater than the length of the intake passage having an intake plenum whose volume is greater than the predetermined stroke volume.

* * * * *